US012688814B2

(12) United States Patent
Liu et al.

(10) Patent No.: US 12,688,814 B2
(45) Date of Patent: Jul. 21, 2026

(54) IMAGE DISPLAY METHOD FOR DISPLAY PANEL, AND DISPLAY DEVICE

(71) Applicant: Yungu (Gu'an) Technology Co., Ltd., Langfang (CN)

(72) Inventors: Hui Liu, Langfang (CN); Yusheng Liu, Langfang (CN); Hongjun Xie, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 19/205,963

(22) Filed: May 12, 2025

(65) Prior Publication Data

US 2025/0279035 A1 Sep. 4, 2025

Related U.S. Application Data

(63) Continuation of application No. PCT/CN2023/088515, filed on Apr. 14, 2023.

(30) Foreign Application Priority Data

Nov. 30, 2022 (CN) ......................... 202211528365.2

(51) Int. Cl.
*G09G 3/3225* (2016.01)
*G09G 3/20* (2006.01)

(52) U.S. Cl.
CPC ......... *G09G 3/2096* (2013.01); *G09G 3/3225* (2013.01); *G09G 2300/0443* (2013.01); *G09G 2300/0452* (2013.01); *G09G 2340/10* (2013.01)

(58) Field of Classification Search
CPC ............... G09G 3/2096; G09G 3/3225; G09G 2300/0443; G09G 2300/0452;
(Continued)

(56) References Cited

U.S. PATENT DOCUMENTS 10,937,998 B1 3/2021 Zhang et al.
10,942,632 B1 3/2021 Sefton
(Continued)

FOREIGN PATENT DOCUMENTS

CN 101510394 A 8/2009
CN 101593348 A 12/2009
(Continued)

OTHER PUBLICATIONS

International Search Report of Application No. PCT/CN2023/088515.
(Continued)

*Primary Examiner* — Antonio Xavier

(74) *Attorney, Agent, or Firm* — Kilpatrick Townsend & Stockton LLP

(57) ABSTRACT

An image display method for a display panel, and a display device. The display panel includes a first display area. The image display method for a display panel includes, according to original image data and first position information for recording the position of first pixel data corresponding to a first display area in the original image data, obtaining the first pixel data corresponding to the first display area from the original image data; and synthesizing the first pixel data and the original image data into target image data, such that the display panel displays at least part of an original image corresponding to the original image data. By means of the image display method, the size of a frame can be reduced, and an image can be normally displayed.

18 Claims, 14 Drawing Sheets

(58) Field of Classification Search
CPC .... G09G 2340/10; G09G 3/3208; G09G 5/14; G06T 3/20
See application file for complete search history.

(56) References Cited

U.S. PATENT DOCUMENTS

| | | | | |
|---|---|---|---|---|
| 2018/0166003 | A1* | 6/2018 | Wang | G06T 5/73 |
| 2021/0134242 | A1* | 5/2021 | Hei | G09G 5/02 |

FOREIGN PATENT DOCUMENTS

| | | | |
|---|---|---|---|
| CN | 107633824 | A | 1/2018 |
| CN | 107644410 | A | 1/2018 |
| CN | 108154838 | A | 6/2018 |
| CN | 109767733 | A | 5/2019 |
| CN | 110620924 | A | 12/2019 |
| CN | 110767695 | A | 2/2020 |
| CN | 111463241 | A | 7/2020 |
| CN | 112508816 | A | 3/2021 |
| CN | 112735261 | A | 4/2021 |
| CN | 113990260 | A | 1/2022 |
| CN | 114566519 | A | 5/2022 |
| CN | 114582265 | A | 6/2022 |
| CN | 114973961 | A | 8/2022 |
| CN | 115273656 | A | 11/2022 |
| CN | 115346483 | A | 11/2022 |
| CN | 115909993 | A | 4/2023 |
| JP | 2011134203 | A | 7/2011 |
| JP | 2013211772 | A | 10/2013 |
| WO | 2021147086 | A1 | 7/2021 |
| WO | 2021213034 | A1 | 10/2021 |
| WO | 2022048473 | A1 | 3/2022 |
| WO | 2022227461 | A1 | 11/2022 |

OTHER PUBLICATIONS

First Office Action of Application No. CN 202211528365.2.
Registration Notice of Application No. CN 202211528365.2.

* cited by examiner

| | S1 | S2 | S3 | S4 | S5 | S6 | S7 | S8 | S9 | S10 | S11 | S12 | S13 | S14 | S15 | S16 | S17 | S18 | S19 | S20 | S21 | S22 | S23 | S24 |
|---|---|---|---|---|---|---|---|---|---|---|---|---|---|---|---|---|---|---|---|---|---|---|---|---|
| | | | | R | | G | | B | | | | | | | | | | | | | | | | |
| L1 | 1-21 | 1-22 | 1-23 | 1-24 | | | | | | | | | | | | | | | | | 1-21 | 1-22 | 1-23 | 1-24 |
| L2 | 2-17 | 2-18 | 2-19 | 2-20 | | | | | | | | | | | | | 2-17 | 2-18 | 2-19 | 2-20 | 2-21 | 2-22 | 2-23 | 2-24 |
| L3 | 3-13 | 3-14 | 3-15 | 3-16 | | | | | | | | | 3-13 | 3-14 | 3-15 | 3-16 | 3-17 | 3-18 | 3-19 | 3-20 | 3-21 | 3-22 | 3-23 | 3-24 |
| L4 | 4-9 | 4-10 | 4-11 | 4-12 | | | | | 4-9 | 4-10 | 4-11 | 4-12 | 4-13 | 4-14 | 4-15 | 4-16 | 4-17 | 4-18 | 4-19 | 4-20 | 4-21 | 4-22 | 4-23 | 4-24 |
| L5 | X | X | X | X | 5-5 | 5-6 | 5-7 | 5-8 | 5-9 | 5-10 | 5-11 | 5-12 | 5-13 | 5-14 | 5-15 | 5-16 | 5-17 | 5-18 | 5-19 | 5-20 | 5-21 | 5-22 | 5-23 | 5-24 |
| L6 | X | X | X | X | 6-5 | 6-6 | 6-7 | 6-8 | 6-9 | 6-10 | 6-11 | 6-12 | 6-13 | 6-14 | 6-15 | 6-16 | 6-17 | 6-18 | 6-19 | 6-20 | 6-21 | 6-22 | 6-23 | 6-24 |
| ... | ... | ... | ... | ... | ... | ... | ... | ... | ... | ... | ... | ... | ... | ... | ... | ... | ... | ... | ... | ... | ... | ... | ... | ... |

Figure 6

R G B

| | S1 | S2 | S3 | S4 | S5 | S6 | S7 | S8 | S9 | S10 | S11 | S12 | S13 | S14 | S15 | S16 | S17 | S18 |
|---|---|---|---|---|---|---|---|---|---|---|---|---|---|---|---|---|---|---|
| L1 | 1-16 | 1-17 | 1-18 | | | | | | | | | | | | | 1-16 | 1-17 | 1-18 |
| L2 | 2-13 | 2-14 | 2-15 | | | | | | | | | | 2-13 | 2-14 | 2-15 | 2-16 | 2-17 | 2-18 |
| L3 | 3-10 | 3-11 | 3-12 | | | | | | | 3-10 | 3-11 | 3-12 | 3-13 | 3-14 | 3-15 | 3-16 | 3-17 | 3-18 |
| L4 | 4-7 | 4-8 | 4-9 | | | | 4-7 | 4-8 | 4-9 | 4-10 | 4-11 | 4-12 | 4-13 | 4-14 | 4-15 | 4-16 | 4-17 | 4-18 |
| L5 | X | X | X | 5-4 | 5-5 | 5-6 | 5-7 | 5-8 | 5-9 | 5-10 | 5-11 | 5-12 | 5-13 | 5-14 | 5-15 | 5-16 | 5-17 | 5-18 |
| L6 | X | X | X | 6-4 | 6-5 | 6-6 | 6-7 | 6-8 | 6-9 | 6-10 | 6-11 | 6-12 | 6-13 | 6-14 | 6-15 | 6-16 | 6-17 | 6-18 |
| … | … | … | … | … | … | … | … | … | … | … | … | … | … | … | … | … | … | … |

Figure 7

R G B

| | S1 | S2 | S3 | S4 | S5 | S6 | S7 | S8 | S9 | S10 | S11 | S12 | S13 | S14 | S15 | S16 | S17 | S18 | S19 | S20 |
|---|---|---|---|---|---|---|---|---|---|---|---|---|---|---|---|---|---|---|---|---|
| L1 | | | | | | | | | | | | | | | | | 1-17 | 1-18 | 1-19 | 1-20 |
| L2 | | | | | | | | | | | | | 2-13 | 2-14 | 2-15 | 2-16 | 2-17 | 2-18 | 2-19 | 2-20 |
| L3 | | | | | | | | | 3-9 | 3-10 | 3-11 | 3-12 | 3-13 | 3-14 | 3-15 | 3-16 | 3-17 | 3-18 | 3-19 | 3-20 |
| L4 | | | | | 4-5 | 4-6 | 4-7 | 4-8 | 4-9 | 4-10 | 4-11 | 4-12 | 4-13 | 4-14 | 4-15 | 4-16 | 4-17 | 4-18 | 4-19 | 4-20 |
| L5 | 5-1 | 5-2 | 5-3 | 5-4 | 5-5 | 5-6 | 5-7 | 5-8 | 5-9 | 5-10 | 5-11 | 5-12 | 5-13 | 5-14 | 5-15 | 5-16 | 5-17 | 5-18 | 5-19 | 5-20 |
| L6 | 6-1 | 6-2 | 6-3 | 6-4 | 6-5 | 6-6 | 6-7 | 6-8 | 6-9 | 6-10 | 6-11 | 6-12 | 6-13 | 6-14 | 6-15 | 6-16 | 6-17 | 6-18 | 6-19 | 6-20 |
| ... | | | | | | | | | | | | | | | | | | | | |
| Newly added L1 | 1-17 | 1-18 | 1-19 | 1-20 | 3-9 | 3-10 | 3-11 | 3-12 | | | | | | | | | | | | |
| Newly added L2 | 2-13 | 2-14 | 2-15 | 2-16 | 4-5 | 4-6 | 4-7 | 4-8 | | | | | | | | | | | | |

Figure 9

IMAGE DISPLAY METHOD FOR DISPLAY PANEL, AND DISPLAY DEVICE

CROSS-REFERENCE TO RELATED APPLICATIONS

The present application is a continuation of International Application No. PCT/CN2023/088515 filed on Apr. 14, 2023, which claims priority to Chinese Patent Application No. 202211528365.2, filed on Nov. 30, 2022 and entitled "IMAGE DISPLAY METHOD FOR DISPLAY PANEL, AND DISPLAY DEVICE", the entire contents of which are incorporated herein by reference.

FIELD

The present application relates to the field of display technologies, and in particular to an image display method for a display panel, and a display device.

BACKGROUND OF THE DISCLOSURE

With rapid development of display devices, users are increasingly demanding higher screen-to-body ratios, and full-screen displays are receiving growing attention in the industry.

However, current display devices such as mobile terminals including smartphones and tablets have black bezels around their display screens, presenting the issue of large bezel sizes. Therefore, there is an urgent need currently to propose a new method of reducing a bezel size and a corresponding image display method.

SUMMARY OF THE DISCLOSURE

The present application provides an image display method for a display panel, and a display device, which can reduce a bezel size while allowing an image to be displayed normally.

In order to solve the problem described above, one embodiment of the present application is to provide an image display method for a display panel. The display panel includes a first active area, and the method includes: obtaining first pixel data corresponding to the first active area from original image data based on the original image data and first position information for recording a position of the first pixel data corresponding to the first active area in the original image data; and synthesizing the first pixel data and the original image data into target image data such that the display panel displays at least a part of an original image corresponding to the original image data.

To solve the above problem, another embodiment of the present application is to provide a display device including a display panel and a driver chip that are connected, where the display panel includes a first active area, and the driver chip is configured to obtain first pixel data corresponding to the first active area from original image data based on the original image data and first position information for recording a position of the first pixel data corresponding to the first active area in the original image data; and synthesize the first pixel data and the original image data into target image data such that the display panel displays at least a part of an original image corresponding to the original image data.

According to the embodiments of the present application, first pixel data corresponding to a first active area is obtained from original image data based on the original image data and first position information for recording a position of the first pixel data corresponding to the first active area in the original image data; and the first pixel data and the original image data are synthesized into target image data such that a display panel displays at least a part of an original image corresponding to the original image data, to ensure display effect and avoid display anomalies, solving the problem of display anomalies in the related art caused by a situation where, in order to reduce the bezel width and achieve full-screen display, a light-emitting layer is arranged above a gate drive circuit of a bezel area, and a pixel circuit driving the light-emitting layer above the gate drive circuit is inserted into a conventional active area of a display panel, and an arrangement order of the newly added pixel circuit and an original pixel circuit in the conventional active area is different from an arrangement order of sub-pixels in the light-emitting layer on the entire display panel, and since an arrangement order of pixel data in original image data is correspondingly consistent with the arrangement order of the sub-pixels in the light-emitting layer on the entire display panel, the arrangement order of the pixel data in the original image data is inconsistent with the arrangement order of the newly added pixel circuit and the original pixel circuit in the conventional active area.

BRIEF DESCRIPTION OF DRAWINGS

FIG. 6 is a schematic diagram showing an implementation relationship of a plurality of data signal lines and corresponding driven sub-pixels in FIG. 3;

FIG. 7 is a schematic diagram showing another implementation relationship of a plurality of data signal lines and corresponding driven sub-pixels;

FIG. 9 is a schematic diagram showing an implementation relationship of a plurality of data signal lines and corresponding driven sub-pixels in FIG. 8;

DETAILED DESCRIPTION OF THE DISCLOSURE

Figure 1:
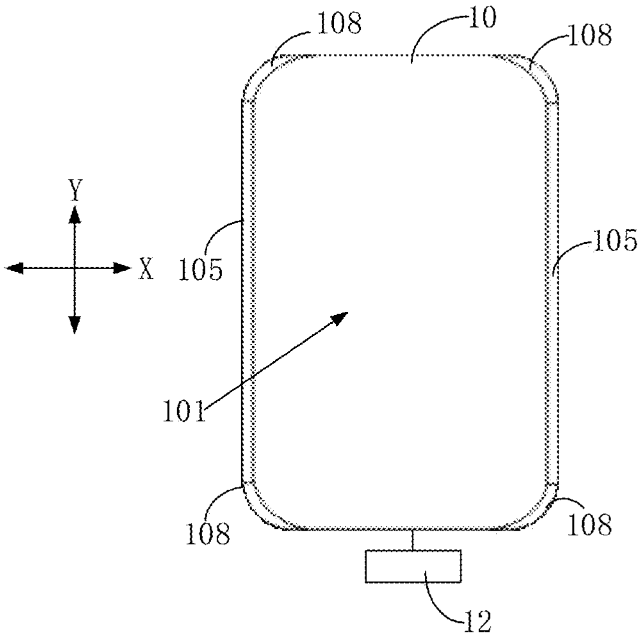
FIG. 1 is a schematic diagram of a structure of an embodiment of a display device.
Figure 2:
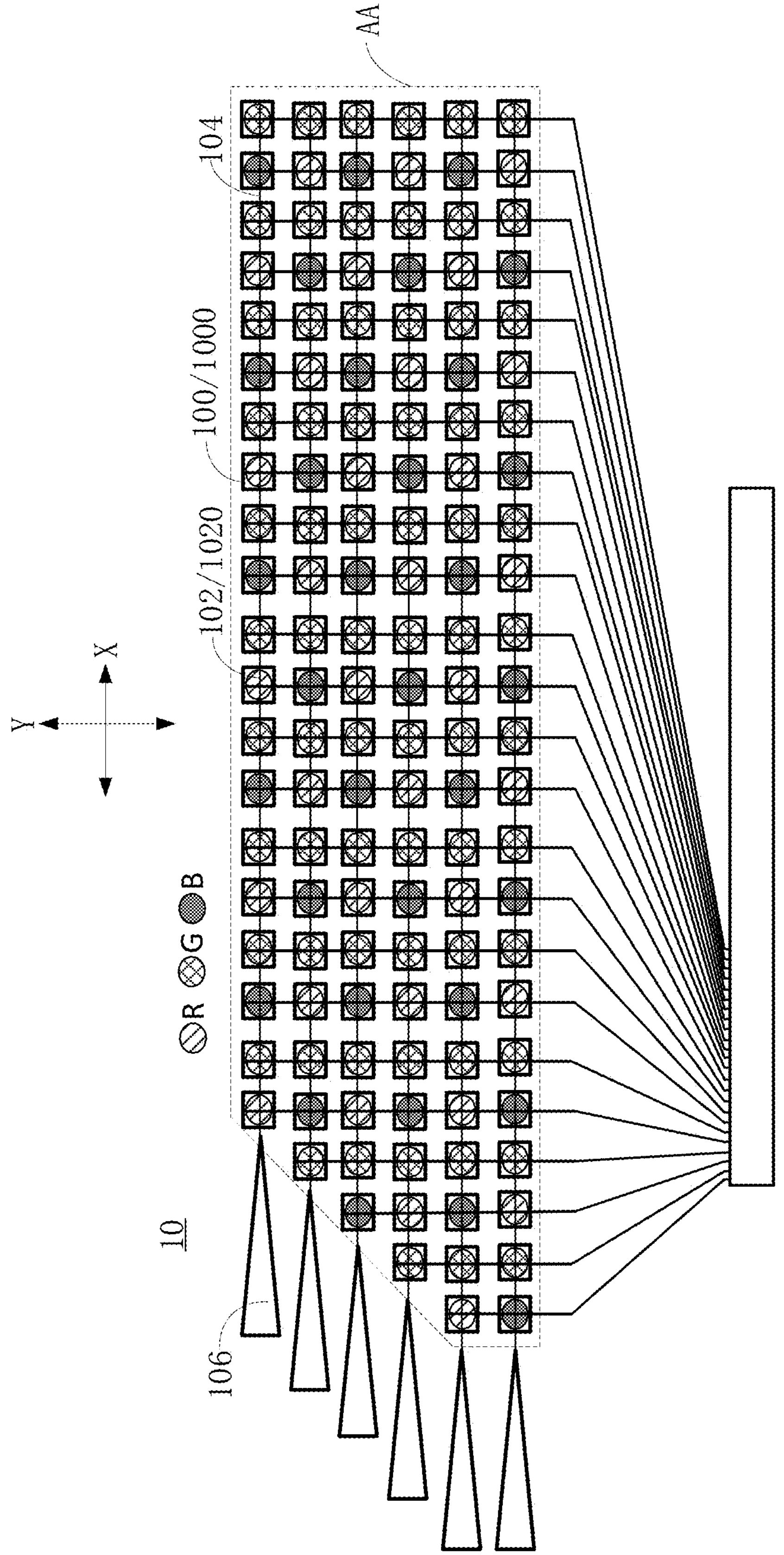
FIG. 2 is a schematic diagram of a partial layout of a display device according to the related art.

Referring to FIG. 1 and FIG. 2, FIG. 1 is a schematic diagram of a structure of an embodiment of a display device, and FIG. 2 is a schematic diagram of a partial layout of a display device according to the related art. The display device referred to in the present application may be an OLED display device or the like. The display device includes a display panel 10 and a driver chip 12 that are connected, and the display panel 10 may include a conventional active area 101 and a bezel area. As shown in FIG. 2, the conventional active area 101 is provided with an array layer 100 and a light-emitting layer 102 arranged in a stacked manner. The array layer 100 includes a plurality of pixel circuits 1000, and the plurality of pixel circuits 1000 may be arranged in an array along a row direction X and a column direction Y. The light-emitting layer 102 includes a plurality of sub-pixels 1020, and the plurality of sub-pixels 1020 may be arranged in an array along the row direction X and the column direction Y. As can be seen, a plurality of pixel circuits 1000 located in the same row in the row direction X are connected to the same gate signal line 104, and each gate signal line 104 is electrically connected to at least one GIP circuit (that is, gate drive circuit) 106 located in the bezel area (such as an area 108 and an area 105). For example, in the row direction X, one end of the gate signal line 104 is electrically connected to a GIP circuit 106 (which may be located, for example, in a left bezel area or right bezel area). For another example, in the row direction X, two ends of the gate signal line 104 arranged oppositely are each electrically connected to a GIP circuit 106, and the two GIP circuits 106 may be located in the left bezel area and the right bezel area, respectively. In the related art, since there are no sub-pixels above the GIP circuit 106, the position of the GIP circuit 106 may occupy a part of the bezel area, resulting in a large size of the bezel area of the display panel. Moreover, there are no pixels in the left bezel area and/or the right bezel area, making it impossible to achieve full-screen display.

Figure 3:
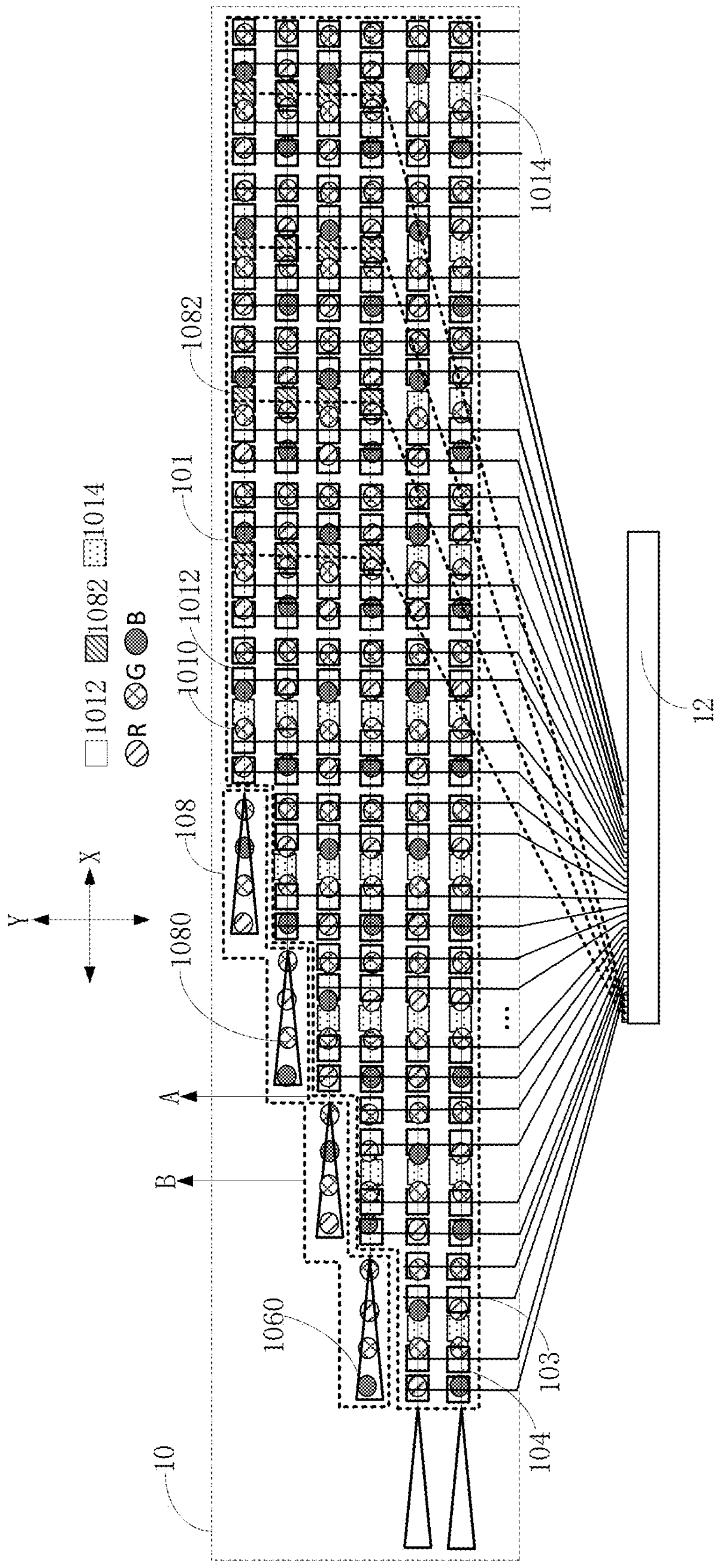
FIG. 3 is a schematic diagram of a partial layout of an embodiment of a display device according to the present application.

In order to solve the above problem and facilitate understanding, the display device provided in the present application will be described in detail below from a structural perspective. Referring to FIG. 3, FIG. 3 is a schematic diagram of a partial layout of an embodiment of a display device according to the present application. A display panel 10 in the display device includes a first active area 108 and a second active area 101. In one embodiment, the first active area 108 may be a peripheral active area (such as a corner active area in FIG. 1), and the second active area 101 may be a non-peripheral active area. Alternatively, the first active area 108 may be an active area corresponding to an under-display camera, and the second active area 101 may be the remaining active area other than the under-display camera.

The first active area 108 includes a plurality of first sub-pixels 1080, the second active area 101 includes a plurality of first pixel circuits 1082 electrically connected to the plurality of first sub-pixels 1080, a plurality of second sub-pixels 1010, and a plurality of second pixel circuits 1012 electrically connected to the plurality of second sub-pixels 1010. That is, the first pixel circuits 1082 located in the first active area 108 and electrically connected to the first sub-pixels 1080 are shifted into the second active area 101. When the first active area 108 is a peripheral active area, the first active area 108 further includes a plurality of first gate drive circuits 1060. A film layer on which the first gate drive circuits 1060 are located and a film layer on which the first sub-pixels 1080 are located are arranged in a thickness direction of the display panel 10. In this case, the first sub-pixels 1080 may be arranged above the first gate drive circuits 1060. In other words, the first gate drive circuits 1060 may be shifted to be below the first sub-pixels 1080 for the purpose of narrowing the bezel. In one embodiment, an orthographic projection of the first gate drive circuit 1060 is located within the first active area 108. When the first active area 108 is the active area corresponding to the under-display camera, this design may increase the light transmittance at the position of the first active area 108 to improve the shooting performance of the under-display camera. The first gate drive circuits 1060 may be electrically connected to a part of the gate signal lines.

Further, as shown in FIG. 3, the second active area 101 includes a plurality of data signal lines 103 extending in the column direction Y and arranged in the row direction X, and a plurality of gate signal lines 104 extending in the row direction X and arranged in the column direction Y. That is, the column direction Y corresponds to the extension direction of the data signal lines 103 of the display panel 10, and the row direction X corresponds to the extension direction of the gate signal lines 104 of the display panel 10. In one embodiment, as shown in FIG. 3, in the second active area 101, at least one column of circuits formed by a plurality of first pixel circuits 1082 is inserted, in a column manner, into a plurality of columns of circuits formed by a plurality of second pixel circuits 1012. The insertion manner is simple and easy to implement.

On this basis, in one embodiment, as shown in FIG. 3, a plurality of virtual pixel circuits 1014 may also be arranged in the second active area 101. The virtual pixel circuits 1014 differ from the above first pixel circuits 1082 and the second pixel circuits 1012 in not being electrically connected to the data signal lines 103 and the gate signal lines 104 and only serving to improve the visual effect.

In one embodiment, as shown in FIG. 3, the first pixel circuit 1082 and the second pixel circuit 1012 are electrically connected to different data signal lines 103. For example, for clarity of distinction, in FIG. 3, the data signal line 103 electrically connected to the first pixel circuit 1082 is shown by a dashed line, and the data signal line 103 electrically connected to the second pixel circuit 1012 is shown by a solid line. The first pixel circuit 1082 and the second pixel circuit 1012 located in the same row are electrically connected to the same gate signal line 104. This design can reduce the impact on a circuit layout in the original second active area 101, and the design method only requires the introduction of a new data signal line 103 corresponding to the first pixel circuit 1082, without the need of introducing a new gate signal line 104, thereby reducing costs.

Figure 4:
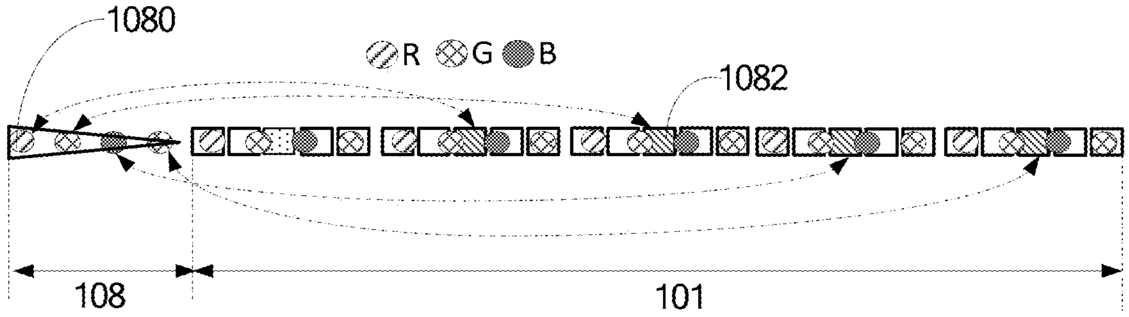
FIG. 4 is a schematic diagram of a partial layout of a row in FIG. 3.

In one embodiment, as shown in FIG. 4, FIG. 4 is a schematic diagram of a partial layout of a certain row in FIG.

3. Taking one of the rows as an example, the first sub-pixel 1080 is located in the same row as the first pixel circuit 1082 to which it is electrically connected. This design can reduce the difficulty in wiring of the electrical connection. It is to be noted that a double-headed arrow in the dashed line in FIG. 4 only represents that there is an electrical connection between the two, not an actual way of wiring. In addition, an arrangement order of a plurality of adjacent first sub-pixels 1080 on the same row may be the same as or different from an arrangement order of a plurality of first pixel circuits 1082 electrically connected thereto. For example, assuming that a plurality of adjacent first sub-pixels 1080 currently on the same row are A1, A2, A3, and A4, respectively, in an order from left to right, a first pixel circuit electrically connected to A1 is B1, a first pixel circuit electrically connected to A2 is B2, a first pixel circuit electrically connected to A3 is B3, and a first pixel circuit electrically connected to A4 is B4. Therefore, an arrangement order of the plurality of first pixel circuits from left to right in this case may be B1, B2, B3 and B4, or, they may also be in another arrangement order such as B2, B3, B1, and B4, which may specifically be set based on the case of wiring.

In one embodiment, the number of first active areas 108 is at least one, and the number of first sub-pixels 1080 in each row of the same first active area 108 is equal to the number of columns of the first pixel circuits 1082 corresponding to the first sub-pixels 1080 of the first active area 108. For example, in FIG. 3, the number of first sub-pixels 1080 in each row of the first active area 108 is 4, and correspondingly the number of columns formed by the plurality of first pixel circuits 1082 is 4. This design can result in a more regular insertion manner of the plurality of first pixel circuits 1082.

In one embodiment, there are a plurality of first active areas 108. For example, referring to FIG. 1 again, when the first active area 108 is a corner active area 14, the number of first active areas 108 may be four.

Figure 5:
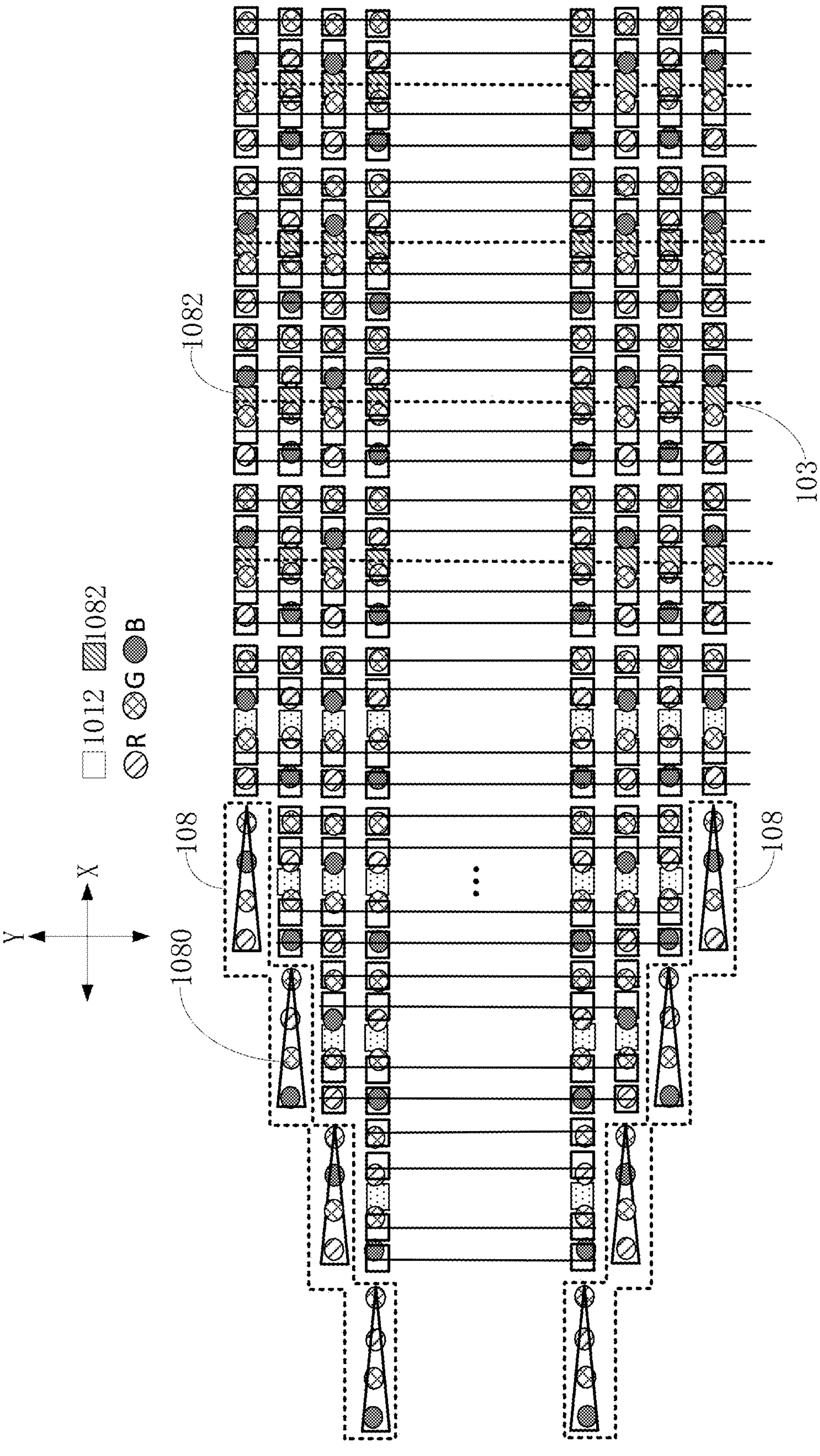
FIG. 5 is a schematic diagram of a partial layout of an embodiment corresponding to two first active areas arranged at an interval in a column direction.

On this basis, as shown in FIG. 5, FIG. 5 is a schematic diagram of a partial layout of an embodiment corresponding to two first active areas arranged at an interval in a column direction. First pixel circuits 1082 corresponding to first sub-pixels 1080 of different first active areas 108 arranged at an interval in a column direction Y are located in the same column (which may be, for example, one column or a plurality of columns) and are electrically connected to the same data signal line 103 (which may be, for example, one or a plurality of data signal lines). This design can reduce the number of data signal lines 103 that need to be added, to reduce the difficulty in wiring and reduce costs. In one embodiment, the first pixel circuits 1082 corresponding to the first sub-pixels 1080 located in the same first active area 108 and arranged in a first direction may be located in the same column. The first direction may be parallel to a boundary line of the first active area 108 and the second active area 101.

And/or, the first pixel circuits 1082 corresponding to the first sub-pixels 1080 that are located in different first active areas 108 arranged at an interval in the row direction X and located in the same row are located in the same row and are electrically connected to the same gate signal line 104. This design can reduce the difficulty in wiring and reduce costs.

In an application scenario, as shown in FIG. 3, in odd-numbered rows, a plurality of first sub-pixels and a plurality of second sub-pixels in the same row are arranged in a sequentially repeating pattern of RGBG. In even-numbered rows, a plurality of first sub-pixels and a plurality of second sub-pixels in the same row are arranged in a sequentially repeating pattern of BGRG. In the column direction, G sub-pixels are located in the same column, and B sub-pixels and R sub-pixels are located in the same column and arranged sequentially and alternately. In this case, as shown in FIG. 6, FIG. 6 is a schematic diagram showing an implementation relationship of a plurality of data signal lines and corresponding driven sub-pixels in FIG. 3. In FIGS. 6, S1 to S24 represent serial numbers of data signal lines, L1 to L6 represent serial numbers of rows, and serial numbers in the remaining boxes represent position serial numbers of the sub-pixels. For example, 1-21 represents position information for the 1$^{st}$ row and the 21$^{st}$ column. A blank box in FIG. 6 indicates that there is no sub-pixel at this position. In areas boxed by dashed lines in FIG. 6, there are position serial numbers of sub-pixels but there are no colors, it is indicated that the positions have sub-pixels but data signal lines of the corresponding columns are not electrically connected thereto. It may be considered that the sub-pixels at the positions are first sub-pixels, that is, their corresponding first pixel circuits are shifted to the second active area. In this case, S1 to S4 are equivalent to newly added data signal lines relative to the related art in FIG. 2.

It is to be noted that, first, referring to FIG. 3 and FIG. 6 together, the serial numbers of the data signal lines in FIG. 6 are not necessarily the same as the positions of the data signal lines in the second active area in FIG. 3. One end of the data signal line may extend to be electrically connected to an output port (not shown) on the driver chip 12, and the serial number of the data signal line may be determined by a position of the output port to which it is electrically connected. For example, in FIG. 3, the positions of the data signal lines 103 (the data signal lines shown by dashed lines in FIG. 3) electrically connected to the first pixel circuits 1082 in the second active area 101 are located in the middle of the remaining data signal lines 103 (the data signal lines shown by solid lines in FIG. 3) electrically connected to the second pixel circuits 1012, but output ports electrically connected to the data signal lines shown by dashed lines at the driver chip 12 are located at the periphery of output ports electrically connected to the data signal line shown by solid lines. In this case, the serial numbers of the data signal lines in FIG. 6 are determined by the positions of the output ports on the driver chip to which they are electrically connected.

Secondly, the data signal lines 103 electrically connected to the plurality of first sub-pixels 1080 drive in the same manner as that of the data signal lines 103 electrically connected to the plurality of second sub-pixels 1010. For example, S5 to S24 are data signal lines electrically connected to the plurality of second sub-pixels 1010, and drive typically in a BRBR alternative driving manner, RBRB alternative driving manner, or GGGG driving manner. S1 to S4 are data signal lines electrically connected to the plurality of first sub-pixels 1080, and can only drive in a BRBR alternative driving manner, RBRB alternative driving manner, or GGGG driving manner. This design can reduce the design difficulty of driving logic inside the driver chip.

Certainly, in other pixel arrangement manners, as shown in FIG. 7, FIG. 7 is a schematic diagram showing another implementation relationship of a plurality of data signal lines and corresponding driven sub-pixels. The corresponding pixel arrangement manner in FIG. 7 is as follows: a plurality of first sub-pixels and a plurality of second sub-pixels in the same row are arranged in a sequentially repeating pattern of RGB. In the column direction, G sub-pixels are located in the same column, B sub-pixels are located in the same column, and R sub-pixels are located in the same column. In this case, as shown in FIGS. 7, S1 to S18 in FIG. 7 represent serial numbers of data signal lines, L1 to L6 represent serial numbers of rows, and serial numbers in the remaining boxes represent position serial numbers of the sub-pixels. For example, 1-16 represents position information for the 1st row and the 16th column. A blank box in FIG. 7 indicates that there is no sub-pixel at this position. In FIG. 7, boxes having position serial numbers of sub-pixels but not colored (that is, areas circled by the dashed boxes in FIG. 7) represent that the data signal lines of the corresponding columns are not electrically connected thereto. It may be considered that the sub-pixels at the positions are first sub-pixels, that is, their corresponding first pixel circuits are shifted to the second active area. In this case, the data signal lines electrically connected to the plurality of first sub-pixels 1080 drive in the same manner as that of the data signal lines electrically connected to the plurality of second sub-pixels 1010. For example, S4 to S18 are data signal lines electrically connected to the plurality of second sub-pixels 1010, and drive typically in an RRRR driving manner, a BBBB driving manner, or a GGGG driving manner. S1 to S3 are data signal lines electrically connected to the plurality of first sub-pixels 1080, and can only drive in an RRRR driving manner, a BBBB driving manner, or a GGGG driving manner. In this case, S1 to S3 are equivalent to newly added data signal lines relative to the related art in FIG. 2.

In one embodiment, the number of rows of a circuit array formed by the second pixel circuits 1012 is equal to the number of rows of a circuit array formed by the first pixel circuits 1082 and the second pixel circuits 1012, that is, the added first pixel circuits 1082 are added to the second pixel circuits 1012 only in a column manner. In one embodiment, the number of columns of the circuit array formed by the first pixel circuits 1082 and the second pixel circuits 1012 is equal to the sum of the number of columns of a circuit array formed by the second pixel circuits 1012 and the number of columns of a circuit array formed by the first pixel circuits 1082.

In summary, that is to say, regardless of the pixel arrangement manner of the light-emitting layer and the position to which the first pixel circuits electrically connected to the first sub-pixels within the first active area are shifted, it is feasible as long as the driving manner of the data signal lines of the column in which the first pixel circuits shifted inward are located is the same as the driving manner of the data signal lines of the column in which the second pixel circuits are located.

Figure 8:
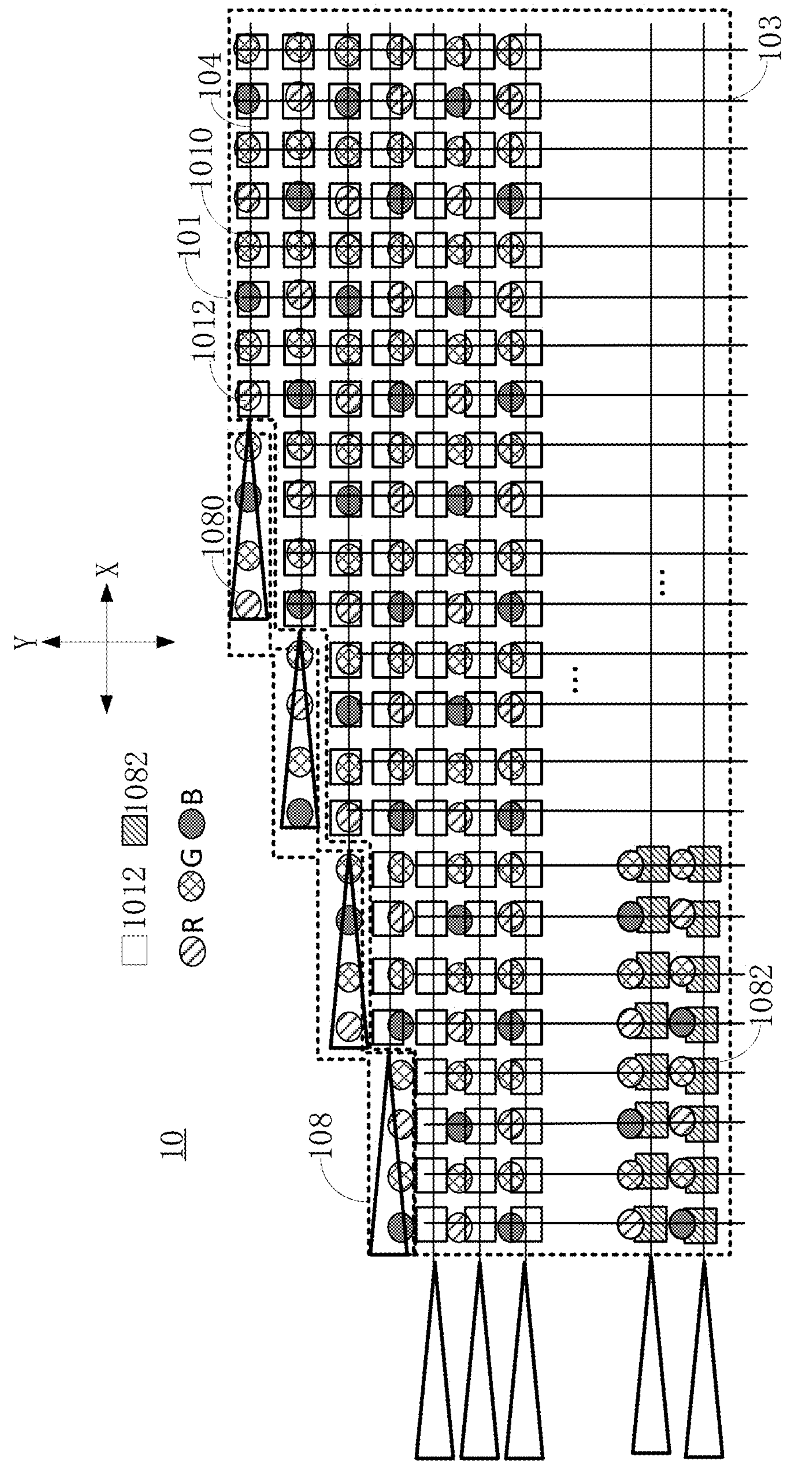
FIG. 8 is a schematic diagram of a partial layout of an embodiment of a display device according to the present application.

In another embodiment, as shown in FIG. 8, FIG. 8 is a schematic diagram of a partial layout of an embodiment of a display device according to the present application. In the second active area 101, at least one row of circuits formed by a plurality of first pixel circuits 1082 is inserted, in a row manner, into a plurality of rows of circuits formed by a plurality of second pixel circuits 1012. The insertion manner is simple and easy to implement.

On this basis, in one embodiment, the first pixel circuits 1082 and the second pixel circuits 1012 are electrically connected to different gate signal lines 104. The first pixel circuit 1082 and the second pixel circuit 1012 located in the same column are electrically connected to the same data signal line 103. This design can reduce the impact on a circuit layout in the original second active area 101, and the design method only requires the introduction of a new gate signal line 104 and a gate drive circuit corresponding to the first pixel circuit 1082, without the need of introducing a new data signal line 103, thereby reducing costs.

In one embodiment, there may also be a plurality of first active areas 108. For example, referring to FIG. 1 again, when the first active area 108 is the corner active area, the number of first active areas 108 may be four. The first pixel circuits 1082 corresponding to the first sub-pixels 1080 in the plurality of first active areas 108 may be located in two rows. This design can reduce the number of gate signal lines 104 that need to be introduced, thereby reducing costs.

For example, the first pixel circuits 1082 corresponding to the first sub-pixels 1080 in each first active area 108 may be located in two rows. The first sub-pixels 1080 corresponding to the first pixel circuits 1082 in one row are arranged in a sequentially repeating pattern of RGBG. The first sub-pixels 1080 corresponding to the first pixel circuit 1082 in the other row are arranged in a sequentially repeating pattern of BGRG. Further, in one embodiment, as shown in FIG. 1, the first pixel circuits 1082 corresponding to the first sub-pixels 1080 located in the two first active areas 108 arranged symmetrically in the row direction X may be located in two identical newly added rows. The first pixel circuits 1082 corresponding to the first sub-pixels 1080 in the two first active areas 108 arranged symmetrically in the column direction Y may be located in two different newly added rows. For example, the first pixel circuits 1082 corresponding to the first sub-pixels 1080 in the upper two first active areas 108 in FIG. 1 may be located in two newly added rows, and the first pixel circuits 1082 corresponding to the first sub-pixels 1080 in the lower two first active areas 108 in FIG. 1 may be located in two other newly added rows. That is, for the four first active areas 108 in FIG. 1, only four new rows need to be added.

For another example, as shown in FIG. 1, the first pixel circuits 1082 corresponding to the first sub-pixels 1080 located in two first active areas 108 arranged symmetrically in the row direction X may be located in the same row, and the first pixel circuits 1082 corresponding to the first sub-pixels 1080 in the two first active areas 108 arranged symmetrically in the column direction Y may be located in different rows. For example, the first pixel circuits 1082 corresponding to the first sub-pixels 1080 in the upper two first active areas 108 in FIG. 1 may be located in the same newly added row, and the first pixel circuits 1082 corresponding to the first sub-pixels 1080 in the lower two first active areas 108 in FIG. 1 may be located in the next newly added row. That is, for the four first active areas 108 in FIG. 1, only two new rows need to be added.

In summary, the present application does not impose strict restrictions on specific positions to which the first pixel circuits 1082 are moved, as long as the driving manner of the original data signal lines 103 is not affected after the first pixel circuits is moved and electrically connected to the data signal lines 103.

Specifically, as shown in FIG. 9, FIG. 9 is a schematic diagram showing an implementation relationship of a plurality of data signal lines and corresponding driven sub-pixels in FIG. 8. In FIG. 9, S1 to S20 represent serial numbers of data signal lines, L1 to L6, the newly added L1, and the newly added L2 represent serial numbers of rows, and serial numbers in the remaining boxes represent position serial numbers of the sub-pixels. For example, 1-20 represents position information for the 1st row and the 20th column. A blank box in FIG. 9 indicates that there is no sub-pixel at this position. In FIG. 9, boxes having position serial numbers of sub-pixels but not colored (that is, areas circled by the dashed boxes in FIG. 9) represent that the data signal lines of the corresponding columns are not electrically connected thereto. It may be considered that the sub-pixels at the positions are first sub-pixels, that is, their corresponding first pixel circuits are shifted to the second active area.

It is to be noted that the first pixel circuits corresponding to the plurality of first sub-pixels are shifted to the row direction where the newly added L1 and the newly added L2 are located, and since the data signal lines electrically connected to the plurality of first pixel circuits are the same as the data signal lines electrically connected to the plurality of second pixel circuits, the present application does not require additional data signal lines, but only requires corresponding additional gate signal lines. Therefore, the present application does not impose excessive restrictions on the specific position to which the first pixel circuit corresponding to a single first sub-pixel is shifted, as long as the driving manner of the original data signal line is not changed after the first pixel circuit is connected. For example, for the signal line S1, the bottom-up driving manner is still the BRBR alternative driving manner, for the signal line S2, the bottom-up driving manner is still the GGGG driving manner, and for the signal line S3, the bottom-up driving manner is still the RBRB alternative driving manner. This design can reduce the design difficulty of driving logic inside the driver chip.

In one embodiment, the number of columns of a circuit array formed by the second pixel circuits 1012 is equal to the number of columns of a circuit array formed by the first pixel circuits 1082 and the second pixel circuits 1012, that is, the added first pixel circuits 1082 are added to the second pixel circuits 1012 only in a row manner. In one embodiment, the number of rows of the circuit array formed by the first pixel circuits 1082 and the second pixel circuits 1012 is equal to the sum of the number of rows of a circuit array formed by the second pixel circuits 1012 and the number of rows of a circuit array formed by the first pixel circuits 1082.

In the above embodiment, as shown in FIG. 3, the extension direction of the boundary line A of the first active area 108 and the second active area 101 intersects the column direction Y. For example, the boundary line A of the first active area 108 and the second active area 101 may be zigzag-shaped, arc-shaped, polyline-shaped, wave-shaped, or the like. Further, as shown in FIG. 3, an outline B of one side of the first active area 108 away from the second active area 101 intersects the column direction Y. For example, the outline B of the side of the first active area 108 away from the second active area 101 may be zigzag-shaped, arc-shaped, polyline-shaped, wave-shaped, or the like. That is, the active area of the above display panel 10 (including the first active area 108 and the second active area 101) is an irregularly-shaped active area. For example, the active area of the display panel 10 is a rounded rectangular active area. In one embodiment, as shown in FIG. 1, there are four first active areas 108, one-to-one corresponding to four corners of the rounded rectangular active area.

It is to be noted that when the active area is a rectangular active area, for example, the first active area is a rectangular active area, it is only necessary to connect corresponding pins of the driver chip to the first pixel circuits of the second active area to guarantee the normal display without the need of extracting the first pixel data corresponding to the first active area. When the active area of the display panel 10 is an irregularly-shaped active area, compared to the case where the active area is a rectangular active area, only adjusting the connection relationship between the pins of the driver chip and the first pixel circuits of the second active area still cannot guarantee the display effect. Therefore, the present application extracts the first pixel data corresponding to the first active area from the original image data, and synthesizes it with the original image data into the target image data, to avoid abnormal display.

Further, referring again to FIG. 1 and FIG. 10, FIG. 10 is a schematic diagram of a partial layout of another embodiment of a display device according to the present application. The display panel 10 further includes a third active area 105. The third active area 105 and the first active area 108 are located at the periphery of the second active area 101. An extension direction of a boundary line C of the third active area 105 and the second active area 101 is parallel to the column direction Y. The third active area 105 includes a plurality of third sub-pixels 1050 and a plurality of second gate drive circuits 1062, and a film layer on which the second gate drive circuits 1062 are located and a film layer on which the third sub-pixels 1050 are located are arranged in the thickness direction of the display panel 10. The second active area 101 further includes a plurality of third pixel circuits 1052 electrically connected to the plurality of third sub-pixels 1050. The third active area 105 described above may be understood as a non-corner peripheral active area, and the third pixel circuits 1052 corresponding to the third sub-pixels 1050 in the third active area 105 described above are similar to the first pixel circuits 1082 corresponding to the first sub-pixels 1080 in the first active area 108, all shifted into the second active area 101 to provide a clearance space for the second gate drive circuits 1062 in the third active area 105, thereby achieving the purpose of reducing the width of the bezel. The second gate drive circuits 1062 may be electrically connected to a part of the gate signal lines.

Figure 10:
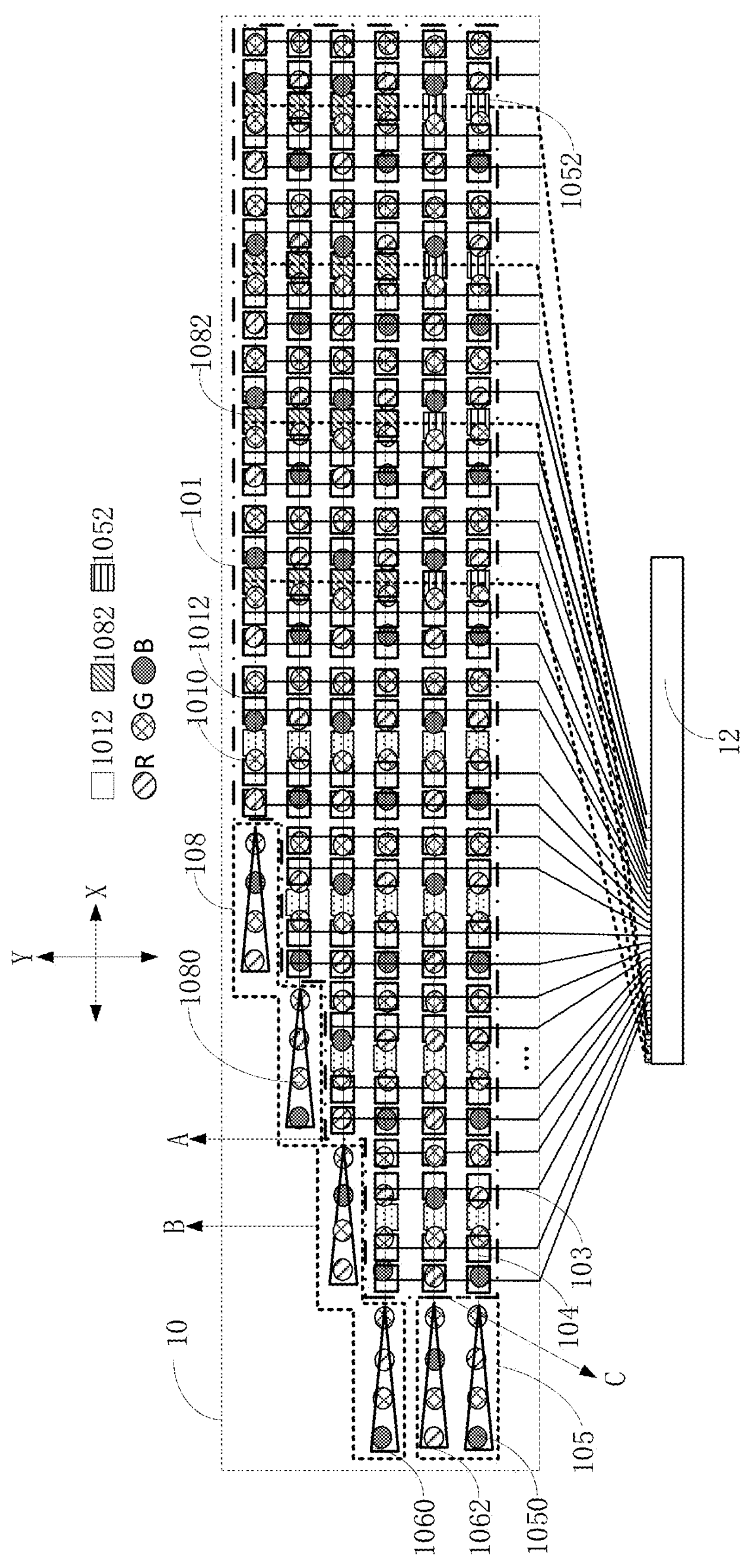
FIG. 10 is a schematic diagram of a partial layout of another embodiment of a display device according to the present application.

In one embodiment, as shown in FIG. 10, similar to the first pixel circuits 1082, in the second active area 101, at least one column of circuits formed by the third pixel circuits 1052 is inserted, in a column manner, into a plurality of columns of circuits formed by the second pixel circuits 1012. In one embodiment, the third pixel circuit 1052 and the second pixel circuit 1012 are electrically connected to different data signal lines 103. The third pixel circuit 1052 and the second pixel circuit 1012 in the same row are electrically connected to the same gate signal line 104. The insertion manner is simple and easy to implement.

On this basis, as shown in FIG. 10, in one embodiment, the third pixel circuits 1052 and the first pixel circuits 1082 are in the same column (may be one column or a plurality of columns). The numbers of columns of the third pixel circuits 1052 and the first pixel circuits 1082 may be the same. In one embodiment, the third pixel circuits 1052 and the first pixel circuits 1082 are electrically connected to the same data signal line 103 (which may be, for example, one or a plurality of data signal lines 103). This design can reduce the number of data signal lines 103 required, thereby reducing costs. In one embodiment, the third pixel circuits 1052 and the first pixel circuits 1082 are located in the same column, thereby reducing the difficulty in wiring.

In one embodiment, the number of rows of a circuit array formed by the third pixel circuits 1052 is equal to the number of rows of a circuit array formed by the third pixel circuits 1052 and the second pixel circuits 1012, that is, the added third pixel circuits 1052 are added to the second pixel circuits 1012 only in a column manner. In one embodiment, the number of columns of the circuit array formed by the third pixel circuits 1052 and the second pixel circuits 1012 is equal to the sum of the number of columns of a circuit array formed by the second pixel circuits 1012 and the number of columns of the circuit array formed by the third pixel circuits 1052.

In one embodiment, the third pixel circuits 1052 are inserted into the second pixel circuits 1012 in a column manner, and the first pixel circuits 1082 may be inserted into the second pixel circuits 1012 in a column manner or a row manner.

In one embodiment, the number of the third active areas 105 is at least one, and the number of third sub-pixels 1050 in each row of the same third active area 105 is equal to the number of columns of the third pixel circuits 1052 corresponding to the third sub-pixels 1050 of the third active area 105. In one embodiment, a plurality of third active areas 105 may be located on two opposite sides of the second active area 101 in the row direction. The third active area 105 and the first active area 108 located on the same side of the two opposite sides of the second active area 101 in the row direction may be arranged in the column direction.

In one embodiment, the number of first sub-pixels 1080 in each row in the first active area 108 is the same as the number of third sub-pixels 1050 in each row in the third active area 105. In one embodiment, the number of columns corresponding to the third pixel circuits 1052 is the same as the number of columns corresponding to the first pixel circuits 1082. For example, in FIG. 10, the number of first sub-pixels 1080 in each row in the first active area 108 is 4, the number of third sub-pixels 1050 in each row in the third active area 105 is 4, the number of columns corresponding to the first pixel circuits 1082 is also 4, and the number of columns corresponding to the third pixel circuits 1052 is also 4. In this case, the newly added data signal lines 103 may be reduced compared to the case where the third pixel circuits 1052 and the first pixel circuits 1082 are located in different columns. That is, it is unnecessary to change the structural design of the driver chip 12 excessively, thereby reducing costs.

Figure 11:
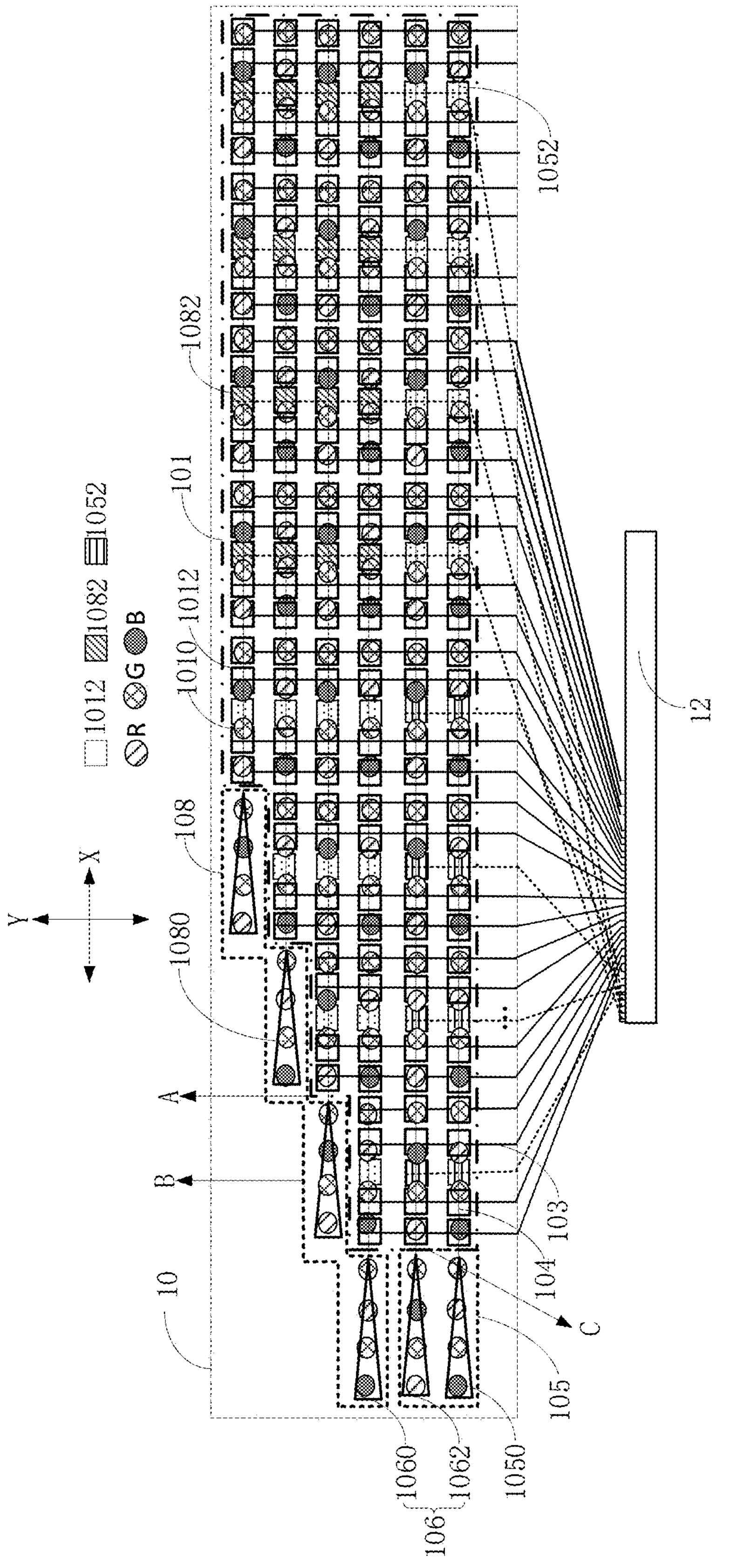
FIG. 11 is a schematic diagram of a partial layout of another embodiment of a display device according to the present application.

Certainly, in another embodiment, as shown in FIG. 11, FIG. 11 is a schematic diagram of a partial layout of another embodiment of a display device according to the present application. The third pixel circuit 1052 and the first pixel circuit 1082 are electrically connected to different data signal lines 103. In one embodiment, the third pixel circuit 1052 and the first pixel circuit 1082 are located in different columns. The data signal line 103 corresponding to the first pixel circuit and the data signal line 103 corresponding to the third pixel circuit 1052 need to be newly added, which has a certain process of reducing the processing amount for a subsequent image processing process of the driver chip 12. It is unnecessary to extract third image data of the third active area from the original image data, which will be expanded in detail in the subsequent method section.

Certainly, in another embodiment, similar to the first pixel circuits 1082 in FIG. 8, in the second active area 101, at least one row of circuits formed by the plurality of third pixel circuits 1052 is inserted, in a row manner, into a plurality of rows of circuits formed by the plurality of second pixel circuits 1012. The insertion manner is simple and easy to implement.

On this basis, in one embodiment, the third pixel circuits 1052 and the first pixel circuits 1082 may be located in the same row(s) (which may be one row or a plurality of rows). The numbers of rows of the third pixel circuits 1052 and the first pixel circuits 1082 may be the same. In one embodiment, the third pixel circuits 1052 and the first pixel circuits 1082 may be connected to the same gate signal line 104, and the third pixel circuits 1052 and the second pixel circuits 1012 may be electrically connected to different gate signal lines 103. The third pixel circuits 1052 and the second pixel circuits 1012 located in the same column are electrically connected to the same data signal line. This design can reduce the impact on the circuit layout in the original second active area, and the design method only requires the introduction of a new gate signal line and gate drive circuit corresponding to the first pixel circuit, without the need of introducing a new data signal line, thereby reducing costs. In one embodiment, the third pixel circuits 1052 and the first pixel circuits 1082 may be located in different rows. Setting may be performed as required, which is not limited in the present application.

In one embodiment, the third pixel circuits 1052 are inserted into the second pixel circuits 1012 in a row manner, and the first pixel circuits 1082 may be inserted into the second pixel circuits 1012 in a column manner or a row manner.

The first pixel circuits 1082, the second pixel circuits 1012, and the third pixel circuits 1052 may include drive transistors, switching transistors, storage capacitors, or the like. The switching transistors may include some or all of data write transistors, light-emitting control transistors, gate initialization transistors, anode initialization transistors, and threshold compensation transistors. The gate signal line may include one or more of a scan signal line and a light-emitting control signal line. The gate signal line may be electrically connected to a gate of a switching transistor to control on/off thereof. The data write transistor may be electrically connected to the data signal line to transmit a data signal to a drive transistor and the drive transistor generates a drive current to drive the sub-pixel (which may be a light-emitting element) to emit light.

Figure 12:
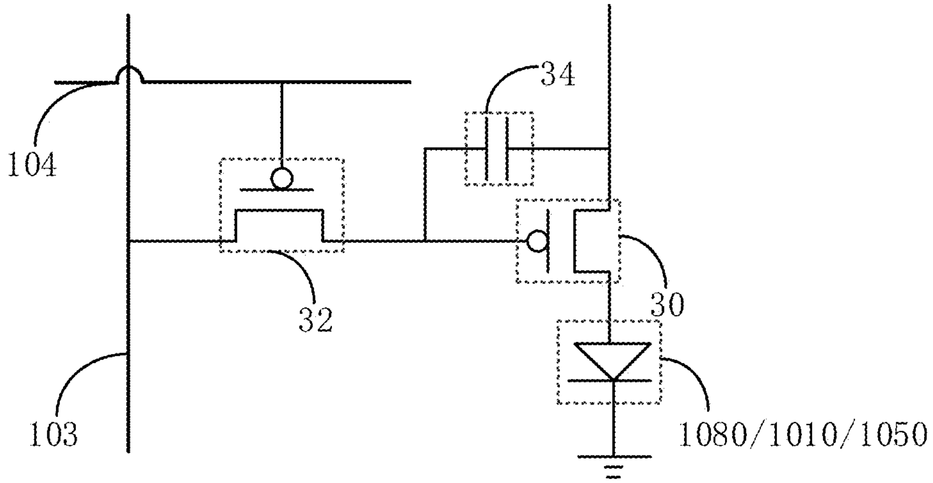
FIG. 12 is a schematic diagram of a structure of an embodiment of a first pixel circuit or a second pixel circuit or a third pixel circuit.

In one application scenario, as shown in FIG. 12, FIG. 12 is a schematic diagram of a structure of an embodiment of a first pixel circuit or a second pixel circuit or a third pixel circuit. The first pixel circuit or the second pixel circuit or the third pixel circuit may be a 2T1C pixel circuit, which may include a drive transistor 30, a switching transistor 32, and a storage capacitor 34, and specific connection between the three components can be learned from FIG. 12 and will not be described further herein. A gate of the switching transistor 32 may be electrically connected to the gate signal line 104. One of the terminals of the switching transistor 32 may be electrically connected to the data signal line 103.

The first gate drive circuit 1060 and the second gate drive circuit 1062 may be shift registers, may be connected in cascade, and may output one or more of a scan signal and a light-emitting control signal to the gate signal line.

Figure 13:
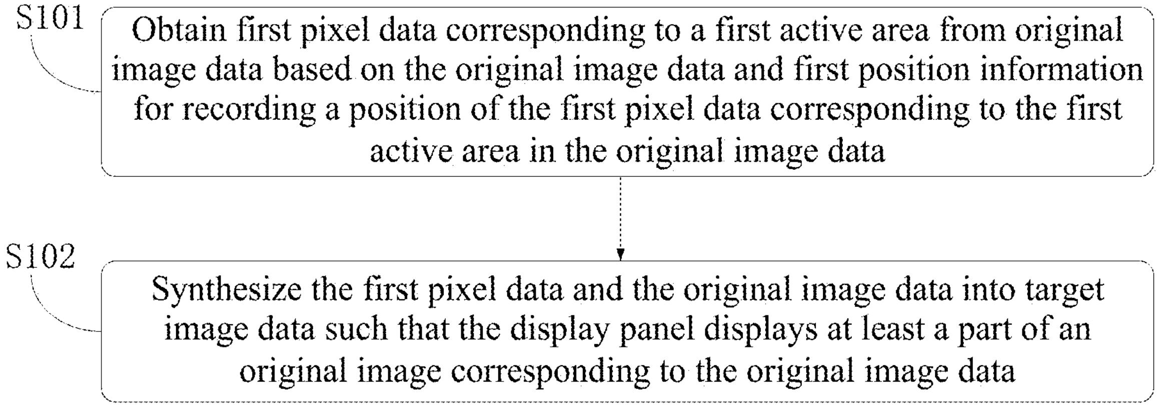
FIG. 13 is a schematic flowchart of an embodiment of an image display method for a display panel according to the present application.

The display device provided in the present application is described in detail below from a method perspective. Referring to FIG. 13, FIG. 13 is a schematic flowchart of an embodiment of an image display method for a display panel according to the present application. The display panel includes a first active area 108 and a second active area 101, and an executive subject of the image display method may be the above-mentioned driver chip. The image display method includes the following steps:

S101: Obtain first pixel data corresponding to a first active area from original image data based on the original image data and first position information for recording a position of the first pixel data corresponding to the first active area in the original image data.

Specifically, the original image data may include a plurality of pieces of sub-pixel data, and the plurality of pieces of adjacent sub-pixel data constitute a pixel data unit. A light-emitting layer in the display panel 10 may include a plurality of sub-pixels, and likewise, the plurality of adjacent sub-pixels constitute a pixel unit. The pixel data units of at least a part of the original image data one-to-one correspond to the pixel units in the light-emitting layer. For example, when the pixel data units in the original image data are of RGB and the pixel units in the light-emitting layer are of RGBG, one RGB pixel data unit in the original image data corresponds to one RGBG pixel unit in the light-emitting layer, and in this case, the sub-pixel data in the original image data does not one-to-one correspond to the sub-pixels in the light-emitting layer. For another example, when the pixel data units in the original image data are of RGB and the pixel units in the light-emitting layer are of RGBG, one RGB pixel data unit in the original image data corresponds to one RG pixel unit or one BG pixel unit in the light-emitting layer, and in this case, the sub-pixel data in the original image data does not one-to-one correspond to the sub-pixels in the light-emitting layer. For still another example, when the pixel data units in the original image data are of RGB and the pixel units in the light-emitting layer are of RGB, one RGB pixel data unit in the original image data corresponds to one RGB pixel unit in the light-emitting layer, and in this case, the sub-pixel data in the original image data can one-to-one correspond to the sub-pixels in the light-emitting layer.

In one embodiment, a row direction of an array formed by the original image data, a row direction of an array formed by the target image data, and a row direction of a sub-pixel array or a pixel circuit array on the display panel correspond to the extension direction of the gate signal lines. In one embodiment, a column direction of the array formed by the original image data, a column direction of the array formed by the target image data, and a column direction of the sub-pixel array or the pixel circuit array on the display panel correspond to the extension direction of the data signal lines.

In one embodiment, the positional relationship of the first active area 108 and the second active area 101 in the display panel is the same as the positional relationship of the first pixel data corresponding to the first active area 108 and the second pixel data corresponding to the second active area 101 in the original image data.

In order to simplify the computation process of the driver chip, first position information of the first pixel data corresponding to the first active area 108 (that is, first position information of the first sub-pixels 1080 in the first active area 108) may be stored, for example, may be stored in a shift-in rule lookup table.

In one embodiment, the first position information includes: the row numbers of the first pixel data corresponding to the first active area 108 in the array formed by the original image data, the number of pieces of first pixel data in each row, and the position of the first piece of first pixel data in each row. That is, the first position information may include: the row numbers of the first sub-pixels 1080 in the first active area 108, the number of first sub-pixels 1080 in each row, and the position of the first one of the first sub-pixels 1080 in each row. When there are a plurality of first active areas 108, storage may be performed simultaneously, and when the numbers of the first sub-pixels 1080 in the two first active areas 108 arranged at an interval in the row direction are the same, the number of first sub-pixels 1080 in each row in only one of the first active areas 108 may be stored in the shift-in rule lookup table. In other words, the shift-in rule lookup table may store the number of pieces of the first pixel data in each row corresponding to only one of the first active areas 108. For example, as shown in Table 1 below, Table 1 is the shift-in rule lookup table corresponding to Embodiment 1.

TABLE 1

Shift-in Rule Lookup Table for Embodiment 1

| Lookup table input (row address) | Lookup table output (first position information) |
|---|---|
| 1 | 4, 21, 2137 |
| 2 | 4, 17, 2141 |
| 3 | 4, 13, 2145 |
| 4 | 4, 9, 2149 |
| . . . | . . . |
| . . . | . . . |
| 1078 | 4, 17, 2141 |
| 1079 | 4, 21, 2137 |
| 1080 | 4, 21, 2137 |

Taking the first row of data in Table 1 as an example, "1" represents the row number. "4" in "4,21,2137" represents that the left and right first active areas each include 4 first sub-pixels. "21" represents that the first sub-pixels 1080 included in the left first active area 108 are four sub-pixels from left to right starting from the 21$^{st}$ one, or in other words, the first pixel data included in the first pixel data corresponding to the left first active area 108 is four pieces of first pixel data from left to right starting from the 21$^{st}$ one. "2137" represents that the first sub-pixels 1080 included in the right first active area 108 are four sub-pixels from left to right starting from the 2137$^{th}$ one, or in other words, the first pixel data included in the first pixel data corresponding to the right first active area 108 is four pieces of first pixel data from left to right starting from the 2137$^{th}$ one. It is to be noted that a rule may be predetermined specifically for whether starting from right to left or from left to right.

It may be appreciated that when the numbers of first sub-pixels 1080 in the left and right first active areas 108 located in the same row are different, the number of first sub-pixels 1080 corresponding to each of the first active areas 108 may be respectively increased in the table in this case, or in other words, the number of pieces of the first pixel data in each row corresponding to each of the first active areas 108 may be increased in the shift-in rule lookup table. For example, "4,21,2137" in Table 1 above may be changed to "4,21,3,2137", where "4" represents the number of first sub-pixels 1080 included in the left first active area 108, or in other words, the number of pieces of first pixel data included in the corresponding row of the first pixel data corresponding to the left first active area 108, and "3" represents the number of first sub-pixels 1080 included in the right first active area 108, or in other words, the number of pieces of first pixel data included in the corresponding row of the first pixel data corresponding to the right first active area 108.

Alternatively, the first position information includes: row numbers of the first pixel data corresponding to the first active area 108 in the array formed by the original image data and column numbers of all the first pixel data in each row, that is, the first position information includes: row numbers of the first sub-pixels 1080 in the first active area 108 and positions of all the first sub-pixels 1080 in each row. For example, as shown in Table 2 below. Table 2 is a shift-in rule lookup table corresponding to Embodiment 1.

TABLE 2

| Shift-in Rule Lookup Table for Embodiment 2 | |
|---|---|
| Lookup table input (row address) | Lookup table output (first position information) |
| 1 | 4, 21, 24, 22, 23, 4, 2137, 2140, 2138, 2139 |
| 2 | 4, 17, 20, 18, 19, 4, 2141, 2142, 2143, 2144 |
| 3 | 4, 13, 16, 14, 15, 4, 2145, 2148, 2146, 2147 |
| 4 | 4, 9, 12, 11, 10, 4, 2149, 2152, 2150, 2151 |
| . . . | . . . |
| . . . | . . . |
| 1078 | 4, 17, 20, 18, 19, 4, 2141, 2142, 2143, 2144 |
| 1079 | 4, 21, 24, 22, 23, 4, 2137, 2140, 2138, 2139 |
| 1080 | 4, 21, 24, 22, 23, 4, 2137, 2140, 2138, 2139 |

The positions of the first pixel data corresponding to each first sub-pixel 1080 have been stored in the above Table 2, and therefore, "4" in Table 2 may be understood to serve as a flag bit. The first time the driver chip reading the digital number indicates that it is the first position information of the first pixel data corresponding to one of the first active areas 108, and the second time the driver chip reading the digital number indicates that it is the first position information of the first pixel data corresponding to another first active area 108. In addition, it is notable that the order of reading the first pixel data corresponding to the four first sub-pixels 1080 of the same first active area 108 in Table 2 may be successive or non-successive, that is, out-of-order storage is supported in the present application.

Further, the specific implementation process of the above step S101 may be: receiving the original image data and calling the shift-in rule lookup table to obtain the first position information of the first pixel data; when the sub-pixel data in the original image data does not one-to-one correspond to the sub-pixels in the light-emitting layer, obtaining first pixel data unit position information of the pixel units in which the first sub-pixels are located based on the first position information, and obtaining corresponding pixel data units from the original image data based on the first pixel data unit position information, where the pixel data unit may include luminance information and color information; and converting the pixel data unit into first pixel data corresponding to each first sub-pixel, the first pixel data including the luminance information and the color information; or, when the sub-pixels in the original image data one-to-one correspond to the sub-pixels in the light-emitting layer, obtaining the first pixel data corresponding to the first sub-pixels directly from the original image data based on the first position information.

S102: Synthesize the first pixel data and the original image data into target image data such that the display panel displays at least a part of an original image corresponding to the original image data.

As can be seen from the above description of the structural part of the display device, a plurality of pixel circuits electrically connected to the driver chip constitute a driver array. The first pixel circuits corresponding to the first sub-pixels in the first active area are inserted into the second pixel circuits in the second active area, and as a result, in this case, the number of rows of the driver array may be greater than the number of rows of a light-emitting array constituted by all the sub-pixels in the light-emitting layer, and/or, the number of columns of the driver array may be greater than the number of columns of the light-emitting array constituted by all the sub-pixels in the light-emitting layer. The positional relationship of the newly added first pixel circuit 1082 on the display panel and the original second pixel circuit 1012 in the second active area 101 is inconsistent with the positional relationship of the first sub-pixel and the second sub-pixel, and the positional relationship of the first pixel data corresponding to the first active area and the second pixel data corresponding to the second active area in the original image data is correspondingly consistent with the positional relationship of the first sub-pixel and the second sub-pixel on the display panel. Therefore, the positional relationship of the first pixel data corresponding to the first active area and the second pixel data corresponding to the second active area in the original image data is inconsistent with the positional relationship of the newly added first pixel circuit 1082 on the display panel and the original second pixel circuit 1012 in the second active area 101. To avoid display anomalies, and enable the driver chip to drive the light-emitting layer to display at least a part of the original image corresponding to the original image data, the first pixel data and the original image data may be synthesized into the target image data, and the position of the newly added first pixel data in the target image data matches the position of the newly added first pixel circuit 1082, and although the driver chip outputs the target image data, the light-emitting layer still finally displays at least a part of the original image, thereby ensuring the display effect.

In the above embodiment, the shape of the outline of the original image may be different from the shape of the active area of the display panel. For example, in general, the outline shape of the original image is generally rectangular. However, the active area of the display panel may be shaped as the rounded rectangular active area in FIG. 1, and therefore, in this case, the display panel may only display a part of the original image corresponding to the original image data.

In addition, the above target image data is generally data including color and luminance, and in order to enable display of the display panel, the above image display method further includes: converting the target image data into a data signal, and outputting the data signal to the data signal line of the display panel, and the display panel displays at least a part of the original image corresponding to the original image data. In one embodiment, the data signal includes a drive voltage signal, and the like.

In one embodiment, in general, there are a plurality of pieces of first pixel data, and in order to simplify the process of synthesizing the target image data, a shift-in rule lookup table may be pre-stored. The shift-in rule lookup table stores second position information, and the second position information includes an insertion row number and/or insertion column number of the first pixel data corresponding to the first active area when added to the original image data. For example, by taking Table 1 above as an example, the output of the lookup table may be extended to include the first position information and the second position information. For example, when the addition position is on the same row as the first pixel data, "4,21,2137" in the above Table 1 may be changed to "4,21,5,2137,2133", where the newly added "5" represents that the newly added four pieces of first pixel data shifted inward are added from left to right starting from the $5^{th}$ column of the original image data of the current row. The newly added "2133" represents that the four pieces of first pixel data shifted inward are added from left to right starting from the $2133^{rd}$ column of the original image data of the current row. The present application does not overly limit the form of the specific storage in the shift-in rule table.

Further, the specific implementation process of the above step S102 may be: adding the first pixel data to the corresponding position in the original image data based on the second position information corresponding to the position to which the first pixel data is added to the original image data, to obtain the target image data.

Figure 14:
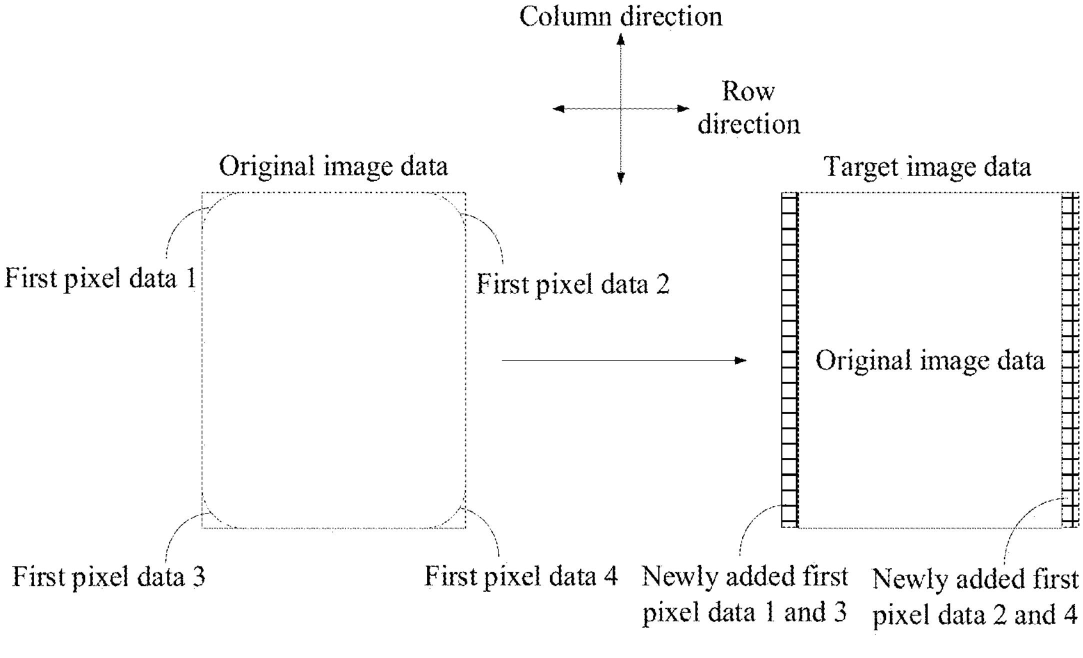
FIG. 14 is a schematic diagram showing an effect of an embodiment of synthesizing target image data when first pixel data is added in a column manner.
Figure 15:
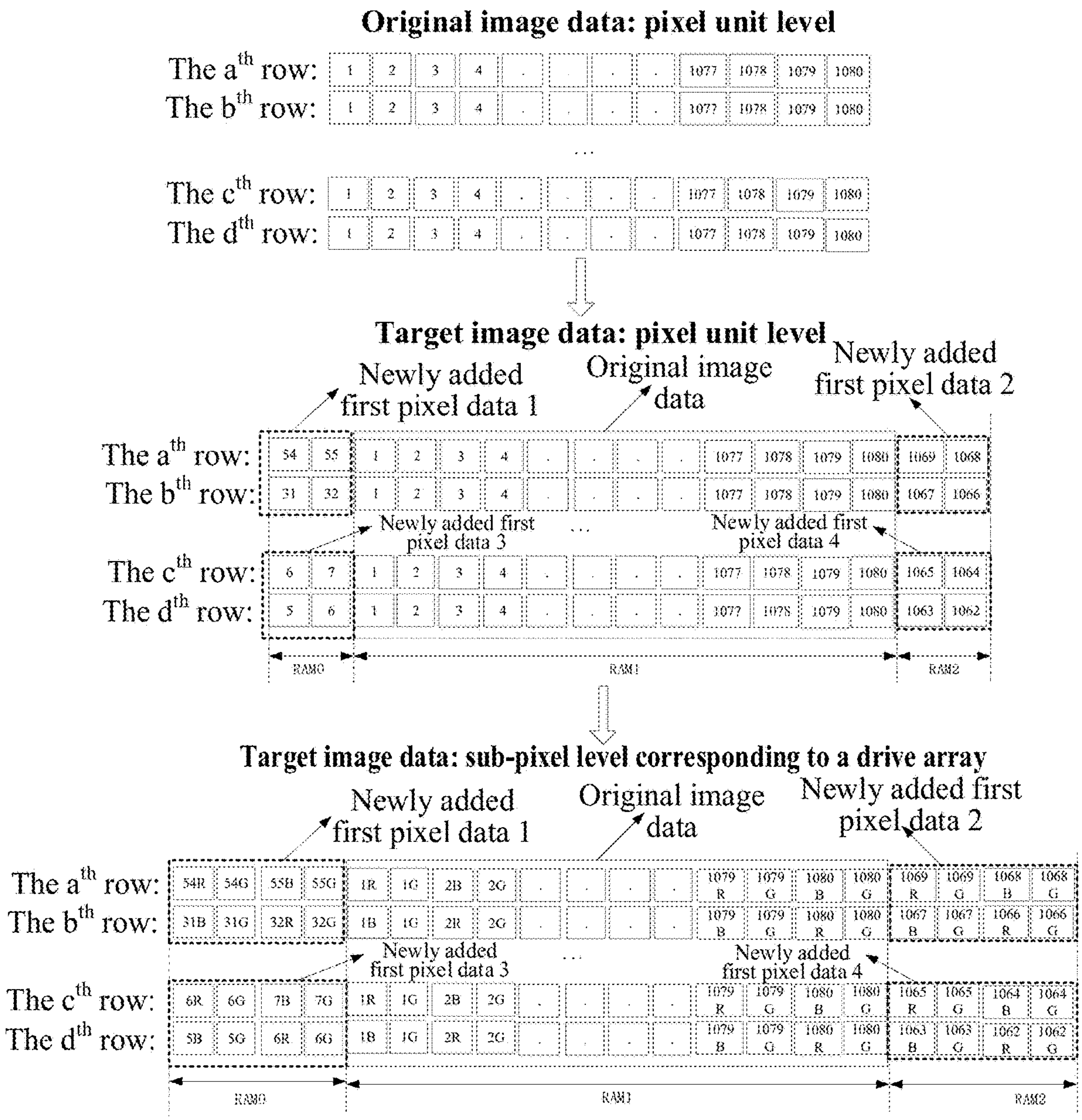
FIG. 15 is a schematic partial diagram of an embodiment of synthesizing the target image data when the first pixel data is added in the column manner in FIG. 14.

In an application scenario, as shown in FIG. 3, when in the second active area 101, at least one column of circuits formed by the plurality of first pixel circuits 1082 is inserted into the plurality of columns of circuits formed by the plurality of second pixel circuits 1012, the specific implementation process of the above step S102 may be: adding, in a column manner, at least one column of data formed by the first pixel data to a plurality of columns of data formed by the original image data, to obtain the target image data. For example, as shown in FIG. 14 and FIG. 15, FIG. 14 is a schematic diagram showing an effect of an embodiment of synthesizing target image data when first pixel data is added in a column manner, and FIG. 15 is a schematic partial diagram of an embodiment of synthesizing the target image data when the first pixel data is added in the column manner in FIG. 14. The method of obtaining the target image data is simple. In FIG. 14, the original image data is rectangular and the active area of the display panel is a rounded rectangular active area.

In one embodiment, the driver chip, when outputting the target image data, typically obtains the target image data row by row.

In one embodiment, the adding, in a column manner, at least one column of data formed by the first pixel data to a plurality of columns of data formed by the original image data, to obtain the target image data includes: obtaining the $i^{th}$ row of first pixel data corresponding to the first active area 108 from the original image data; and concatenating the $i^{th}$ row of first pixel data and a row of original image data corresponding to the $i^{th}$ row of first pixel data into a row of the target image data, and storing the row of the target image data to a preset storage area of the same size as the row of the target image data; where the $i^{th}$ row of the first pixel data is any row of the first pixel data corresponding to the first active area. That is, while obtaining the first pixel data row by row, the data is concatenated row by row and converted into data signals output to the data signal line of the display panel, eliminating the need of arranging a large storage space to pre-store all rows of first pixel data corresponding to the first active area 108 obtained from the original image data. Further, the above image display method further includes: when part or all of the target image data of the current row is converted into a data signal for output to the data signal line of the display panel, storing part or all of the target image data of a next row into a released area in the preset storage area, the released area being a storage area corresponding to the data that has been converted into the data signal in the target image data of the current row. That is, in this embodiment, one row may be concatenated and output at a time to improve the image display effect.

In another embodiment, all rows of the first pixel data corresponding to the first active area 108 may also be stored to a large storage space after all of them have been obtained, and the original image data is stored in its original storage space, that is, the original image data and the newly added first pixel data are stored in different storage areas. The plurality of storage areas may be a plurality of separate RAMs. Alternatively, the plurality of storage areas may also be different partitions in the same RAM. Subsequently, the driver chip may sequentially obtain pixel data of corresponding rows from the plurality of storage areas, and then the data is concatenated to obtain target image data of the corresponding rows, to output the target image data row by row and convert it into data signals. For example, taking the $a^{th}$ row of the target image data in FIG. 15 as an example, the newly added 54 and 55 to the left and the newly added 1032 and 1033 to the right come from storage areas different from that of 1-1080 in the middle, and they can be concatenated into one row of target image data.

In one embodiment, when the first pixel circuits 1082 and the second pixel circuits 1012 are electrically connected to different data signal lines 103 in FIG. 3, and the first pixel circuits 1082 and the second pixel circuits 1012 located in the same row are electrically connected to the same gate signal line 104, the number of rows of the data array formed by the original image data is equal to the number of rows of the data array formed by the target image data. This design can simplify the amount of data in the target image data to reduce the difficulty in computation of the driver chip.

In one embodiment, when the number of first active areas 108 is at least one, and the number of first sub-pixels 1080 in each row of the same first active area 108 is equal to the number of columns of the first pixel circuits 1082 corresponding to the first sub-pixels 1080 of the first active area 108, the number of columns occupied by the newly added first pixel data corresponding to the same first active area 108 in the data array formed by the target image data is equal to the number of pieces of first pixel data in each row corresponding to the first active area 108 in the data array formed by the original image data. For example, referring to FIG. 3, FIG. 6, and FIG. 15, the number of first sub-pixels 1080 in each row of the first active area 108 is 4, and correspondingly the number of columns formed by the plurality of first pixel circuits 1082 is 4. Moreover, two RG sub-pixels or two BG sub-pixels in the first active area constitute a pixel unit, as shown in FIGS. 6, 1-21 and 1-22 in FIG. 6 may be considered as constituting a pixel unit, and 1-23 and 1-24 in FIG. 6 may be considered as constituting a pixel unit. Thus, seen from the pixel unit level, the number of columns occupied by the newly added first pixel data corresponding to the first active area 108 in the data array formed by the target image data is 2, and the number of pieces of first pixel data in each row corresponding to the first active area 108 in the data array formed by the original image data is 2. The image synthesizing method is simple and has a low computation burden. Further, in order to facilitate the driver chip to drive the target image data for display subsequently, the target image data at the pixel unit level described above may also be processed into the form of sub-pixel level corresponding to the driver array of the display panel. Specifically, as shown in FIG. 15, assuming that one pixel unit of the target image data corresponds to one RG or BG of the display panel, one pixel unit of the target image data may be processed into two sub-pixels of RG or BG.

In one embodiment, as shown in FIG. 4, when the first sub-pixels 1080 and the first pixel circuits 1082 electrically connected thereto in the same first active area 108 are located in the same row, the first pixel data in each row corresponding to the same first active area 108 in the data array formed by the original image data is located in the same row in the data array formed by the target image data. It is equivalent to shifting the first pixel data of each row out of the data array formed by the original image data in the row direction, and concatenating it with the data array formed by the original image data into the data array formed by the target image data. The image synthesizing method is simple and has a low computation burden.

Alternatively, as shown in FIG. 3, the driver chip 12 includes output ports (not shown) corresponding to and electrically connected to the data signal lines 103. For example, the data signal lines 103 one-to-one correspond to the output ports. It is defined that a data signal line 103 electrically connected to a first pixel circuit 1082 is electrically connected to a first output port, and a data signal line 103 electrically connected to a second pixel circuit 1012 is electrically connected to a second output port. In a direction of arranging the first output port and the second output port at an interval, the first output port has a first positional relationship relative to the second output port, and newly added first sub-pixel data has the first positional relationship relative to the original image data. For example, in FIG. 3, in the second active area 101, the data signal line 103 electrically connected to the first pixel circuit 1082 is inserted between the data signal lines 103 electrically connected to the second pixel circuits 1012, but on the driver chip 12 side, the first output port of the data signal line 103 electrically connected to the first pixel circuit 1082 is located outside the second output port of the data signal line 103 electrically connected to the second pixel circuit 1012, and in this case, the positional relationship of the newly added first sub-pixel data relative to the original image data is determined by the relative positional relationship of the first output port and the second output port.

In one embodiment, as shown in FIG. 3 and FIG. 14, the first output port is located outside the plurality of second output ports in the direction of arranging the first output port and the second output port at an interval, and then the above step of adding, in a column manner, at least one column of data formed by the first pixel data to the plurality of columns of data formed by the original image data to obtain the target image data includes: adding the at least one column of data formed by the first pixel data to at least one side of two opposite sides of the plurality of columns of data formed by the original image data in the row direction, to obtain the target image data.

Further, as shown in FIG. 8 and FIG. 14, there are a plurality of first active areas 108, and the above step of adding the at least one column of data formed by the first pixel data to at least one side of two opposite sides of the plurality of columns of data formed by the original image data in the row direction, to obtain the target image data includes: adding the first pixel data corresponding to two first active areas 108 arranged at an interval in the row direction to the two opposite sides of the original image data in the row direction, respectively. For example, at least one column of data formed by the first pixel data corresponding to the first active area 108 at the upper left corner is added to the left side of the original image data, and at least one column of data formed by the first pixel data corresponding to the first active area 108 at the upper right corner is added to the right side of the original image data.

In one embodiment, the first pixel data corresponding to the two first active areas arranged at an interval in the row direction is stored in different storage areas. For example, taking FIG. 15 as an example, in the $a^{th}$ row of the target image data, 54 and 55 correspond to a first active area on the left, and 1032 and 1033 correspond to a first active area on the right. The newly added 54 and 55 on the left are stored in a first storage area RAM0, 1-1080 in the middle is stored in a second storage area RAM1, and the newly added 1032 and 1033 on the right are stored in a third storage area RAM3. This design may be convenient for the subsequent concatenating process, thereby improving the processing efficiency.

And/or, as shown in FIG. 5 and FIG. 14, there are a plurality of first active areas 108, and the first pixel data corresponding to the two first active areas 108 arranged at an interval in the column direction is added to the same side of the two opposite sides of the original image data in the row direction. For example, at least one column of data formed by the first pixel data corresponding to the first active areas 108 at the upper left corner and the lower left corner is added to the left side of the original image data. At least one column of data formed by the first pixel data corresponding to the first active area 108 at the upper right corner and the lower right corner is added to the right side of the original image data.

In one embodiment, the first pixel data corresponding to the two first active areas arranged at an interval in the column direction is stored in the same storage area. For example, taking FIG. 15 as an example, in the $a^{th}$ row of the target image data, 54 and 55 correspond to a first active area at the upper left corner, and in the $c^{th}$ row of the target image data, 6 and 8 correspond to a first active area at the lower left corner, and then, 54 and 55, 6 and 8 may be stored in the first storage area in a time-division manner. As the display panel is scanned row by row, this design allows the storage rule to be the same for each row, thereby reducing the complexity of the computation.

Figure 16:
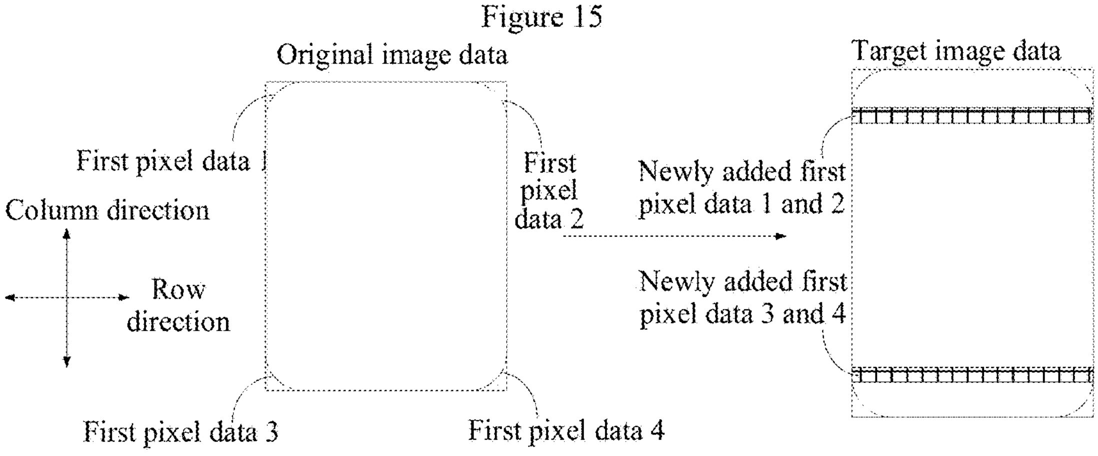
FIG. 16 is a schematic diagram showing an effect of an embodiment of synthesizing target image data when first pixel data is added in a row manner.
Figure 17:
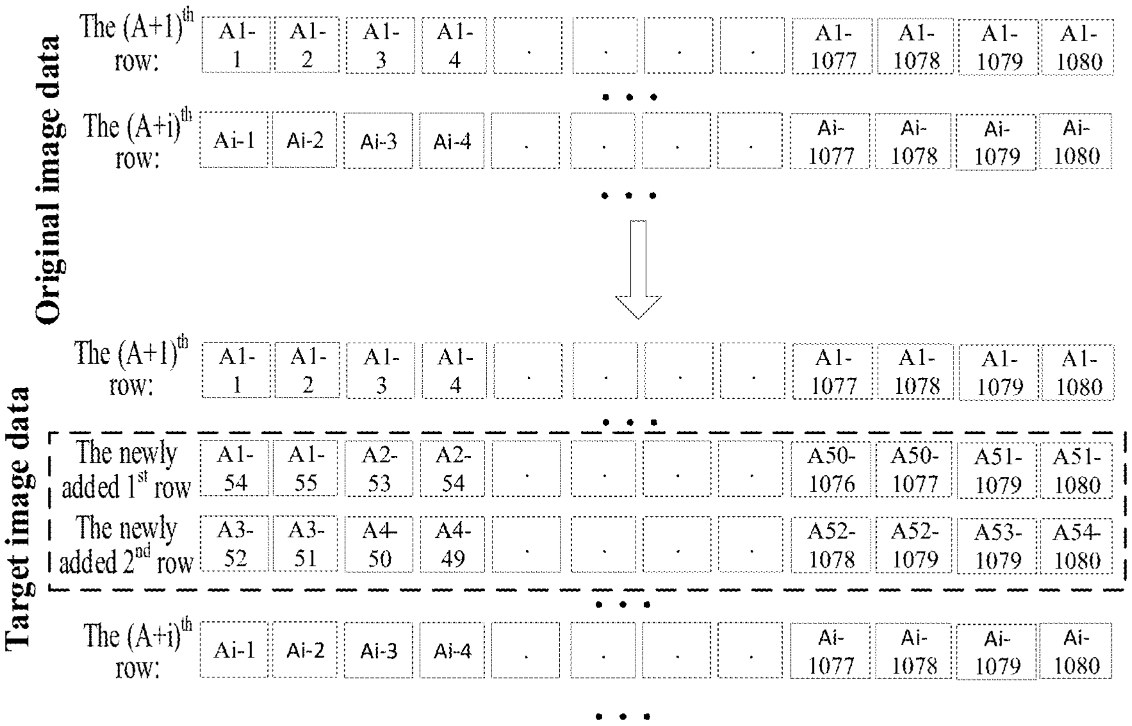
FIG. 17 is a schematic partial diagram of an embodiment of synthesizing the target image data when the first pixel data is added in the row manner in FIG. 16.

In another application scenario, as shown in FIG. 8, when in the second active area 101, at least one row of circuits formed by the plurality of first pixel circuits 1082 is inserted into a plurality of rows of circuits formed by the plurality of second pixel circuits 1012, the step of synthesizing the first pixel data and the original image data into the target image data in the above step S102 includes: adding, in a row manner, at least one row of data formed by the first pixel data to a plurality of rows of data formed by the original image data to obtain the target image data. For example, as shown in FIG. 16 and FIG. 17, FIG. 16 is a schematic diagram showing an effect of an embodiment of synthesizing target image data when first pixel data is added in a row manner, and FIG. 17 is a schematic partial diagram of an embodiment of synthesizing the target image data when the first pixel data is added the row manner in FIG. 16. The method of obtaining the target image data is simple.

In one embodiment, the driver chip, when outputting the target image data, generally obtains the target image data row by row and buffers the current row of target image data into the preset storage area. For example, in FIG. 17, the $(A+1)^{th}$ row and the $(A+i)^{th}$ row of the target image data are the same as the $(A+1)^{th}$ row and the $(A+i)^{th}$ row of the original image data, and the newly added $1^{st}$ row and the newly added $2^{nd}$ row are formed by the newly added first pixel data, and the $(A+1)^{th}$ row, the $(A+i)^{th}$ row, the newly added $1^{st}$ row, and the newly added $2^{nd}$ row of the target image data may be stored in the preset storage area in a time-division manner, to be converted into data signals row by row. It is to be noted that, as can be seen from FIG. 16, the display panel is scanned row by row, and therefore for the first sub-pixels and second sub-pixels located in the same row, as the first pixel circuits corresponding to the first sub-pixels are shifted to another row, the first sub-pixels and the second sub-pixels in the same row will be lit at different times. The time intervals between the pixels being lit are so short that they are not perceivable by the human eyes due to the suspenopisia, and therefore does not affect the display effect. In addition, similar to FIG. 15, both the original image data and the target image data in FIG. 17 are presented at the pixel unit level. In order to facilitate the driver chip to drive the display of the target image data subsequently, the target image data at the pixel unit level described above may further be processed into the form of sub-pixel level corresponding to the driver array of the display panel, and the specific processing is similar to that in FIG. 15, and will not be described in detail here.

In one embodiment, as shown in FIG. 8, when the first pixel circuits 1082 and the second pixel circuits 1012 are electrically connected to different gate signal lines 104, and the first pixel circuits 1082 and the second pixel circuits 1012 located in the same column are electrically connected to the same data signal line 103, the number of columns of the data array formed by the original image data is equal to the number of columns of the data array formed by the target image data. This design can reduce the workload of data processing of the driver chip.

Alternatively, when added in a row manner, one row of added first pixel data comes from a plurality of rows of first pixel data in the data array formed by the original image data. For example, with reference to FIG. 17, in the newly added 1$^{st}$ row in the target image data, A1-54 and A1-55 come from the 1$^{st}$ row of first pixel data in the data array formed by the original image data. A2-53 and A2-54 come from the 2$^{nd}$ row of first pixel data in the data array formed by the original image data. This design can reduce the workload of data processing of the driver chip.

In one embodiment, the adding manner of adding the first pixel data corresponding to the first active area to the original image data and the insertion manner of inserting the first pixel circuits 1082 into the second pixel circuits 1012 are the same, for example, both being the column manner, or both being the row manner.

Figure 18:
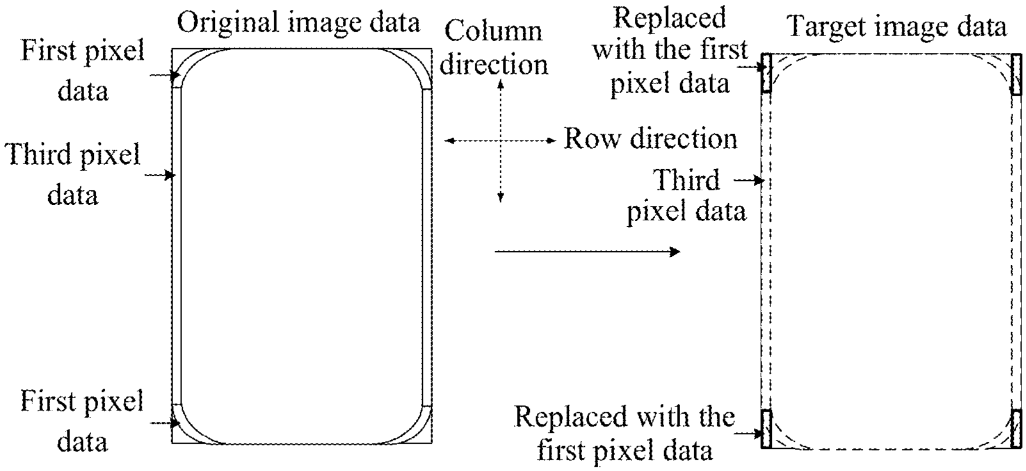
FIG. 18 is a schematic diagram showing an effect of an embodiment of synthesizing target image data.

In yet another application scenario, when the display panel further includes a third active area 105, and as shown in FIG. 10, when the third pixel circuits 1052 and the first pixel circuits 1082 are located in the same column, or when the third pixel circuits 1052 and the first pixel circuits 1082 are correspondingly electrically connected to the same data signal line 103, the step of synthesizing the first pixel data and the original image data into target image data in the above step S102 includes: replacing, with the first pixel data, pixel data in the array formed by the original image data that is located in the same column but not in the same row as the third pixel data corresponding to the third active area, to obtain the target image data. That is, in this case, there is no need to extract the third pixel data corresponding to the third active area in the original image data, only the first pixel data needs to be extracted and newly added. It is equivalent to shifting the first pixel data of each row in the row direction to the boundary line of the data array formed by the original image data, and the first pixel data and the third pixel data are located in the same column, thereby forming the data array formed by the target image data, without changing the third pixel data. In one embodiment, in the data array formed by the original image data, the number of pieces of the first pixel data in each row corresponding to the same first active area is equal to the number of pieces of the third pixel data in each row corresponding to the third active area arranged in the column direction of the first active area. For the specific effect diagram, reference may be made to FIG. 18, and FIG. 18 is a schematic diagram showing an effect of an embodiment of synthesizing target image data.

In one embodiment, the positional relationship of the third active area and the second active area in the display panel is the same as the positional relationship of the third pixel data corresponding to the third active area and the second pixel data corresponding to the second active area in the data array formed by the original image data. In one embodiment, the positional relationships of the first active area, the third active area, and the second active area in the display panel are the same as the positional relationships of the first pixel data corresponding to the first active area, the third pixel data corresponding to the third active area, and the second pixel data corresponding to the second active area in the data array formed by the original image data.

In another application scenario, when the display panel further includes the third active area 105, and as shown in FIG. 11, when the first pixel data is added to the original image data in a column or row manner, and the third pixel data is not subjected to extraction, re-addition, or the like to form the target image data, and the second active area and the third active area perform display with the original image data in the target image data; and the first active area performs display with the newly added first pixel data in the target image data. At this time, the driver chip is configured to output a data signal, into which the original image data in the target image data is converted, to the second pixel circuit and the third pixel circuit; and output the data signal, into which the newly added first pixel data in the target image data is converted, to the first pixel circuit. The specific effect diagram is similar to that in FIG. 14.

In another application scenario, when the display panel further includes the third active area 105, the third pixel circuits 1052 are inserted into the second pixel circuits 1012 in a column manner, the third pixel circuits 1052 and the first pixel circuits 1082 are located in different columns (in other words, when the third pixel circuits 1052 and the first pixel circuits 1082 are electrically connected to different data signal lines 103), the first pixel circuits 1082 are inserted into the second pixel circuits 1012 in a column manner, the first pixel data is added to the original image data in a column manner, and the third pixel data is not subjected to extraction and re-addition processing, to form the target image data, which can simplify the data processing.

In another application scenario, when the display panel further includes the third active area 105, the third pixel circuits 1052 are inserted into the second pixel circuits 1012 in a column manner, and the first pixel circuits 1082 are inserted into the second pixel circuits 1012 in a row manner, the first pixel data is added to the original image data in a row manner, and the third pixel data is not subjected to the extraction and re-addition processing, to form the target image data, which can simplify the data processing.

In one embodiment, the third pixel data corresponding to the third active area may be added in a row manner or a column manner to the array formed by the original image data. The adding manner of adding the third pixel data corresponding to the third active area to the original image data and the insertion manner of inserting the third pixel circuits 1052 into the second pixel circuits 1012 are the same, for example, both being the column manner, or both being the row manner. In another application scenario, when the display panel further includes the third active area 105, and the third active area 105 is similar to the first active area 108 in FIG. 8, at least one row of circuits formed by a plurality of third pixel circuits is inserted into a plurality of rows of circuits formed by a plurality of second pixel circuits, at least one row of data formed by the third pixel data may be added, in a row manner, to the plurality of rows of data formed by the original image data, to obtain the target image data. The specific effect diagram is similar to that in FIG. 16.

In another application scenario, when the display panel further includes the third active area 105, and the third active area 105 is similar to the first active area 108 in FIG. 8, at least one column of circuits formed by a plurality of third pixel circuits is inserted into a plurality of columns of circuits formed by a plurality of second pixel circuits, at least one column of data formed by the third pixel data may be added, in a column manner, to the plurality of columns of data formed by the original image data, to obtain the target image data.

In one embodiment, the adding manner of adding the first pixel data to the original image data and the adding manner of adding the third pixel data to the original image data are the same, for example, both being the column manner, or both being the row manner. In one embodiment, the adding manner of adding the first pixel data to the original image data may be different from the adding manner of adding the third pixel data to the original image data.

In one embodiment, the adding manner of adding the first pixel data to the original image data and the adding manner of adding the third pixel data to the original image data are both of the column manner, and the newly added first pixel data and the newly added third pixel data are located in the same column (which may be one column or a plurality of columns, for example) in the data array formed by the target image data, which can reduce the number of data signal lines. The number of columns of the data array formed by the target image data is equal to the number of columns of the data array formed by the original image data. It is equivalent to removing, from the data array formed by the target image data, the third pixel data in the original image data and the rest of the image data in the column in which it resides.

In one embodiment, the adding manner of adding the first pixel data to the original image data and the adding manner of adding the third pixel data to the original image data are both of the row manner, and the newly added first pixel data and the newly added third pixel data are located in the same row(s) (which may be one row or a plurality of rows, for example) in the data array formed by the target image data, which can reduce the number of gate signal lines. The number of columns of the data array formed by the target image data is less than the number of columns of the data array formed by the original image data. It is equivalent to removing, from the data array formed by the target image data, the third pixel data in the original image data and the rest of the image data in the column in which it resides.

In one embodiment, the image display method further includes: obtaining the third pixel data corresponding to the third active area from the original image data based on the original image data and third position information for recording the position of the third pixel data corresponding to the third active area in the original image data. In one embodiment, the third position information includes row numbers of the third pixel data corresponding to the third active area in the array formed by the original image data, the number of pieces of third pixel data in each row, and the position of the first piece of third pixel data in each row. Alternatively, the third position information includes: row numbers of the third pixel data corresponding to the third active area in the array formed by the original image data and column numbers of all the third pixel data in each row.

In one embodiment, the step of synthesizing the target image data includes: adding the third pixel data to the corresponding position in the original image data based on fourth position information corresponding to the position in which the third pixel data is added to the original image data, to obtain the target image data. The fourth position information includes: an insertion row number or insertion column number corresponding to the third pixel data added to the original image data.

In a particular application scenario, the above image display method for a display panel includes:

A. The driver chip receives original image data to be displayed, where the pixel units of the original image data one-to-one correspond to the pixel units of the light-emitting layer.

B. The driver chip calls the shift-in rule lookup table to determine the first position information of the first sub-pixels shifted inward in the light-emitting layer, and obtains the corresponding first sub-pixel data from the original image data based on the first position information, where the first sub-pixel data includes luminance (or gray scale value) and color information.

C. The driver chip calls the shift-in rule lookup table to determine the second position information of the first sub-pixel data inserted in the original image data, and adds a plurality of columns or a plurality of rows of the first sub-pixel data to the original image data based on the second position information to form the target image data.

D. The driver chip outputs the target image data and the display panel displays at least a part of the original image data. Specifically, the driver chip may obtain pixel data of the target image data row by row, and store pixel data corresponding to the newly added sub-pixels and pixel data corresponding to the sub-pixels in the original image to different RAMs; the driver chip may read and obtain corresponding display data from the plurality of RAMs, and concatenate and convert the data into drive voltage data; and the pixel data cached in the current RAM may be deleted to release the space, thereby allowing the storage of the pixel data in the next row of target image data.

What is claimed is:

1. An image display method for a display panel which comprises a first active area, the method comprising:

- obtaining first pixel data corresponding to the first active area from original image data, based on the original image data and first position information for recording a position of the first pixel data corresponding to the first active area in the original image data; and
- synthesizing the first pixel data and the original image data into target image data such that the display panel displays at least a part of an original image corresponding to the original image data;
- wherein the step of synthesizing the first pixel data and the original image data into target image data comprises:
  - adding at least one column of data formed by the first pixel data to a plurality of columns of data formed by the original image data, to obtain the target image data.

2. The method according to claim 1, wherein the step of adding at least one column of data formed by the first pixel data to a plurality of columns of data formed by the original image data, to obtain the target image data comprises: obtaining the i-th row of the first pixel data corresponding to the first active area from the original image data; and concatenating the i-th row of the first pixel data and a row of the original image data corresponding to the i-th row of the first pixel data into a row of the target image data, and storing the row of the target image data to a preset storage area of the same size as the row of the target image data; wherein the i-th row of the first pixel data is any row of first pixel data corresponding to the first active area; and, the image display method further comprises: when at least part of the target image data of a current row is converted into a data signal for output to a data signal line of the display panel, storing part or all of the target image data of a next row into a released area in the preset storage area, the released area being a storage area corresponding to the data that has been converted into the data signal in the target image data of the current row.

3. The method according to claim 1, wherein the number of rows of a data array formed by the original image data is equal to the number of rows of a data array formed by the target image data; and, a number of columns occupied by a newly added first pixel data corresponding to the same first active area in the data array formed by the target image data is equal to a number of the first pixel data in each row corresponding to the first active area in the data array formed by the original image data; and, each row of the first pixel data corresponding to the same first active area in the data array formed by the original image data is located in the same row in the data array formed by the target image data; and, a column direction corresponds to an extension direction of the data signal line of the display panel, and a row direction corresponds to an extension direction of a gate signal line of the display panel; and, the original image data and the newly added first pixel data are stored in different storage areas.

4. The method according to claim 1, wherein the step of adding at least one column of data formed by the first pixel data to a plurality of columns of data formed by the original image data, to obtain the target image data comprises: adding the at least one column of data formed by the first pixel data to at least one side of two opposite sides in the row direction of the plurality of columns of data formed by the original image data, to obtain the target image data.

5. The method according to claim 4, wherein there are a plurality of first active areas, and the step of adding the at least one column of data formed by the first pixel data to at least one side in the row direction of two opposite sides of the plurality of columns of data formed by the original image data, to obtain the target image data comprises: adding the first pixel data corresponding to the two first active areas arranged at an interval in the row direction to two opposite sides of the original image data in the row direction, respectively; and, storing the first pixel data corresponding to the two first active areas arranged at an interval in the row direction in different storage areas; and, adding the first pixel data corresponding to the two first active areas arranged at an interval in the column direction to the same side of two opposite sides of the original image data in the row direction; and, storing the first pixel data corresponding to the two first active areas arranged at an interval in the column direction in the same storage area.

6. The method according to claim 1, wherein the step of synthesizing the first pixel data and the original image data into target image data comprises: adding at least one row of data formed by the first pixel data to a plurality of rows of data formed by the original image data, to obtain the target image data.

7. The method according to claim 6, wherein a number of columns of the data array formed by the original image data is equal to a number of columns of the data array formed by the target image data; and, one row of the added first pixel data comes from a plurality of rows of the first pixel data in the data array formed by the original image data; and, the row direction corresponds to the extension direction of the gate signal line of the display panel, and the column direction corresponds to the extension direction of the data signal line of the display panel; and, the original image data and the newly added first pixel data are stored in different storage areas.

8. The method according to claim 1, wherein the display panel further comprises a second active area, and an extension direction of a boundary line of the first active area and the second active area intersects the column direction; or, an outline of one side of the first active area away from the second active area intersects the column direction; and, the active area of the display panel is an irregularly-shaped active area; or, the active area of the display panel is a rounded rectangular active area, and there are four first active areas, one-to-one corresponding to four corners of the rounded rectangular active area; or, the shape of an outline of the original image is different from the shape of the active area of the display panel.

9. The method according to claim 1, wherein the display panel further comprises a second active area and a third active area, the third active area and the first active area being located at a periphery of the second active area; an extension direction of a boundary line of the third active area and the second active area is parallel to the column direction; the second active area and the third active area perform display with the original image data in the target image data; the first active area performs display with the newly added first pixel data in the target image data; or the step of synthesizing the first pixel data and the original image data into target image data comprises: replacing, with the first pixel data, pixel data in the array formed by the original image data that is located in the same column but not in the same row as third pixel data corresponding to the third active area, to obtain the target image data.

10. The method according to claim 1, wherein the first position information comprises row numbers of the first pixel data corresponding to the first active area in the array formed by the original image data, the number of the first pixel data in each row, and a position of a first one of the first pixel data in each row; or, the first position information comprises: row numbers of the first pixel data corresponding to the first active area in the array formed by the original image data and column numbers of all the first pixel data in each row.

11. The method according to claim 1, wherein the display panel further comprises a second active area, the positional relationship of the first active area and the second active area in the display panel is the same as the positional relationship of the first pixel data corresponding to the first active area and the second pixel data corresponding to the second active area in the data array formed by the original image data; and the step of synthesizing the first pixel data and the original image data into target image data comprises: adding the first pixel data to a corresponding position in the original image data based on second position information corresponding to the position in which the first pixel data is added to the original image data, to obtain the target image data; wherein the second position information comprises: an insertion row number or insertion column number corresponding to the first pixel data added to the original image data.

12. The method according to claim 1, wherein the image display method further comprises: converting the target image data into a data signal, and outputting the data signal to the data signal line of the display panel, wherein the display panel displays at least a part of the original image corresponding to the original image data.

13. A display device, comprising a display panel and a driver chip that are connected, wherein the display panel comprises a first active area, and the driver chip is configured to obtain first pixel data corresponding to the first active area from original image data, based on the original image data and first position information for recording a position of the first pixel data corresponding to the first active area in the original image data; and synthesize the first pixel data and the original image data into target image data such that the display panel displays at least a part of an original image corresponding to the original image data;

wherein the display panel further comprises a second active area, the first active area comprises a plurality of first sub-pixels, the second active area comprises a plurality of first pixel circuits electrically connected to the plurality of first sub-pixels, a plurality of second sub-pixels, and a plurality of second pixel circuits electrically connected to the plurality of second sub-pixels, and the second active area comprises a plurality of data signal lines extending in a column direction and arranged in a row direction, and a plurality of gate signal lines extending in the row direction and arranged in the column direction.

14. The display device according to claim 13, wherein in the second active area, at least one column of circuits formed by the plurality of first pixel circuits is inserted into a plurality of columns of circuits formed by the plurality of second pixel circuits; and the driver chip is configured to add at least one column of data formed by the first pixel data to a plurality of columns of data formed by the original image data, to obtain the target image data.

15. The display device according to claim 14, wherein the first pixel circuits and the second pixel circuits are electrically connected to different ones of the data signal lines; the first pixel circuits and the second pixel circuits located in the same row are electrically connected to the same gate signal line; and, the number of first sub-pixels in each row of the same first active area is equal to the number of columns of the first pixel circuits corresponding to the first sub-pixels of the first active area; and, there are a plurality of first active areas; the first pixel circuits corresponding to the first sub-pixels located in different first active areas arranged at intervals in the column direction are located in the same column and are electrically connected to the same data signal line; and, the first pixel circuits corresponding to the first sub-pixels located in different first active areas arranged at intervals in the row direction and located in the same row are located in the same row and are electrically connected to the same gate signal line.

16. The display device according to claim 13, wherein in the second active area, at least one row of circuits formed by the plurality of first pixel circuits is inserted into a plurality rows of circuits formed by the plurality of second pixel circuits; and the driver chip is configured to add at least one row of data formed by the first pixel data to a plurality of rows of data formed by the original image data, to obtain the target image data.

17. The display device according to claim 16, wherein the first pixel circuits and the second pixel circuits are electrically connected to different ones of the gate signal lines; and the first pixel circuits and the second pixel circuits located in the same column are electrically connected to the same data signal line.

18. The display device according to claim 13, wherein the first active area further comprises a plurality of first gate drive circuits, and a film layer on which the first gate drive circuits are located and a film layer on which the first sub-pixels are located are arranged in a thickness direction of the display panel; or, an extension direction of a boundary line of the first active area and the second active area intersects the column direction; or, an outline of one side of the first active area away from the second active area intersects the column direction; or, the active area of the display panel is an irregularly-shaped active area; or, the active area of the display panel is a rounded rectangular active area; there are four first active areas, one-to-one corresponding to four corners of the rounded rectangular active area; and, the display panel further comprises a third active area, the third active area and the first active area being located at a periphery of the second active area; an extension direction of a boundary line of the third active area and the second active area is parallel to the column direction; the third active area comprises a plurality of third sub-pixels and a plurality of second gate drive circuits, and a film layer on which the second gate drive circuits are located and a film layer on which the third sub-pixels are located are arranged in the thickness direction of the display panel; the second active area further comprises a plurality of third pixel circuits electrically connected to the plurality of third sub-pixels; in the second active area, at least one column of circuits formed by the third pixel circuits is inserted into the plurality of columns of circuits formed by the second pixel circuits; the third pixel circuits and the second pixel circuits are electrically connected to different data signal lines; the third pixel circuits and the second pixel circuits in the same row are electrically connected to the same gate signal line; the third pixel circuits and the first pixel circuits are electrically connected to different data signal lines; the driver chip is configured to output a data signal, into which the original image data in the target image data is converted, to the second pixel circuit and the third pixel circuit; and output the data signal, into which the newly added first pixel data in the target image data is converted, to the first pixel circuit; or, the third pixel circuits and the first pixel circuits are correspondingly electrically connected to same data signal line; and the driver chip is configured to replace, with the first pixel data, pixel data in the array formed by the original image data that is located in the same column but not in the same row as third pixel data corresponding to the third active area, to obtain the target image data.

* * * * *